(12) United States Patent
Hasegawa et al.

(10) Patent No.: US 9,172,931 B2
(45) Date of Patent: Oct. 27, 2015

(54) PROJECTION DISPLAY DEVICE, INFORMATION PROCESSING DEVICE, PROJECTION DISPLAY SYSTEM, AND PROGRAM

(75) Inventors: Fumihiro Hasegawa, Tokyo (JP); Toshio Miyazawa, Kanagawa (JP); Michiyoshi Tachikawa, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 121 days.

(21) Appl. No.: 14/129,228

(22) PCT Filed: Jul. 3, 2012

(86) PCT No.: PCT/JP2012/067417
§ 371 (c)(1),
(2), (4) Date: Dec. 24, 2013

(87) PCT Pub. No.: WO2013/005857
PCT Pub. Date: Jan. 10, 2013

(65) Prior Publication Data
US 2014/0118705 A1 May 1, 2014

(30) Foreign Application Priority Data

Jul. 6, 2011 (JP) .................................. 2011-150440
Mar. 16, 2012 (JP) .................................. 2012-060764

(51) Int. Cl.
*G03B 21/14* (2006.01)
*H04N 9/31* (2006.01)
(Continued)

(52) U.S. Cl.
CPC ............ *H04N 9/3185* (2013.01); *G03B 21/142* (2013.01); *G03B 21/2086* (2013.01);
(Continued)

(58) Field of Classification Search
CPC .. H04N 9/3129; H04N 9/3185; H04N 9/3194
USPC .................. 353/28, 30, 69, 70; 348/743–747; 382/106, 274, 275
See application file for complete search history.

(56) References Cited

U.S. PATENT DOCUMENTS 7,018,055 B2 * 3/2006 Suzuki ........................... 353/122
8,506,093 B2 * 8/2013 Kato .............................. 353/101
(Continued)

FOREIGN PATENT DOCUMENTS

JP 3630015 12/2004
JP 2005-229415 8/2005
(Continued)

OTHER PUBLICATIONS

Extended European Search Report issued on Aug. 5, 2014, in Patent Application No. 12807140.4.
(Continued)

*Primary Examiner* — Sultan Chowdhury
(74) *Attorney, Agent, or Firm* — Oblon, McClelland, Maier & Neustadt, L.L.P.

(57) ABSTRACT

A projection display device including: an image light projecting unit that projects image light on a screen; a distance measurement unit that measures distance to the screen; an obstacle detecting unit that detects an obstacle between the screen and the image light projecting unit on the basis of distance information obtained by the distance measurement unit and, according to a result of this detection, determines an adjustment area where the image light to be projected is to be adjusted; and a projection adjusting unit that adjusts the image light in the adjustment area are included.

8 Claims, 22 Drawing Sheets

(51) Int. Cl.
  *G03B 21/20* (2006.01)
  *G09G 5/393* (2006.01)
  *G03B 21/53* (2006.01)

(52) U.S. Cl.
  CPC ........... *H04N9/3182* (2013.01); *H04N 9/3194* (2013.01); *G03B 21/53* (2013.01); *G09G 5/393* (2013.01); *G09G 2320/0261* (2013.01); *H04N 9/3129* (2013.01)

(56) References Cited

U.S. PATENT DOCUMENTS

| | | | |
|---|---|---|---|
| 9,004,698 B2 * | 4/2015 | Kilcher et al. | ........... 353/69 |
| 2005/0117132 A1 | 6/2005 | Agostinelli | |
| 2005/0179875 A1 | 8/2005 | Aoyanagi | |
| 2007/0273842 A1 | 11/2007 | Morrison et al. | |
| 2008/0106706 A1 | 5/2008 | Holmgren et al. | |
| 2009/0168027 A1 | 7/2009 | Dunn et al. | |
| 2010/0045942 A1 | 2/2010 | Furui | |
| 2010/0182416 A1 | 7/2010 | Holmgren et al. | |

FOREIGN PATENT DOCUMENTS

| | | |
|---|---|---|
| JP | 2005-303493 | 10/2005 |
| JP | 2007-517244 | 6/2007 |
| JP | 2009-003281 | 1/2009 |
| JP | 2009-31334 A | 2/2009 |
| JP | 4366631 | 9/2009 |
| WO | WO 2007/134456 A1 | 11/2007 |

OTHER PUBLICATIONS

International Search Report Issued Oct. 9, 2012 in PCT/JP2012/067417 Filed Jul. 3, 2012.

* cited by examiner

FIG.5

| | | | | | | | | | |
|---|---|---|---|---|---|---|---|---|---|
| 101, | 103, | 099, | 100, | 102, | 104, | 098, | 100, | 097, | 102 |
| 099, | 100, | 102, | 104, | 098, | 100, | 097, | 102, | 100, | 099 |
| 102, | 104, | 098, | 100, | 097, | 102, | 101, | 103, | 099, | 100, |
| 100, | 097, | 102, | 100, | 099, | 099, | 100, | 102, | 104, | 098, |
| 102, | 104, | 098, | 100, | 097, | 102, | 101, | 103, | 099, | 100, |
| 101, | 103, | 099, | 100, | 102, | 104, | 098, | 100, | 097, | 102 |
| 101, | 103, | 099, | 100, | 102, | 104, | 098, | 100, | 097, | 102 |
| 100, | 097, | 102, | 100, | 099, | 099, | 100, | 102, | 104, | 098, |
| 102, | 104, | 098, | 100, | 097, | 102, | 101, | 103, | 099, | 100, |

FIG.6

| | | | | | | | | | |
|---|---|---|---|---|---|---|---|---|---|
| 101, | 103, | 099, | 100, | 102, | 104, | 098, | 100, | 097, | 102 |
| 099, | 100, | 102, | 104, | 098, | 100, | 097, | 102, | 100, | 099 |
| 102, | 104, | 098, | 100, | 097, | 102, | 101, | 103, | 099, | 100, |
| 100, | 097, | 102, | 100, | 050, | 059, | 100, | 102, | 104, | 098, |
| 102, | 104, | 098, | 100, | 057, | 052, | 101, | 103, | 099, | 100, |
| 101, | 103, | 099, | 060, | 052, | 054, | 058, | 100, | 097, | 102 |
| 101, | 103, | 099, | 060, | 062, | 054, | 058, | 100, | 097, | 102 |
| 100, | 097, | 102, | 050, | 059, | 059, | 060, | 102, | 104, | 098, |
| 102, | 104, | 098, | 060, | 057, | 052, | 051, | 103, | 099, | 100, |

FIG.19
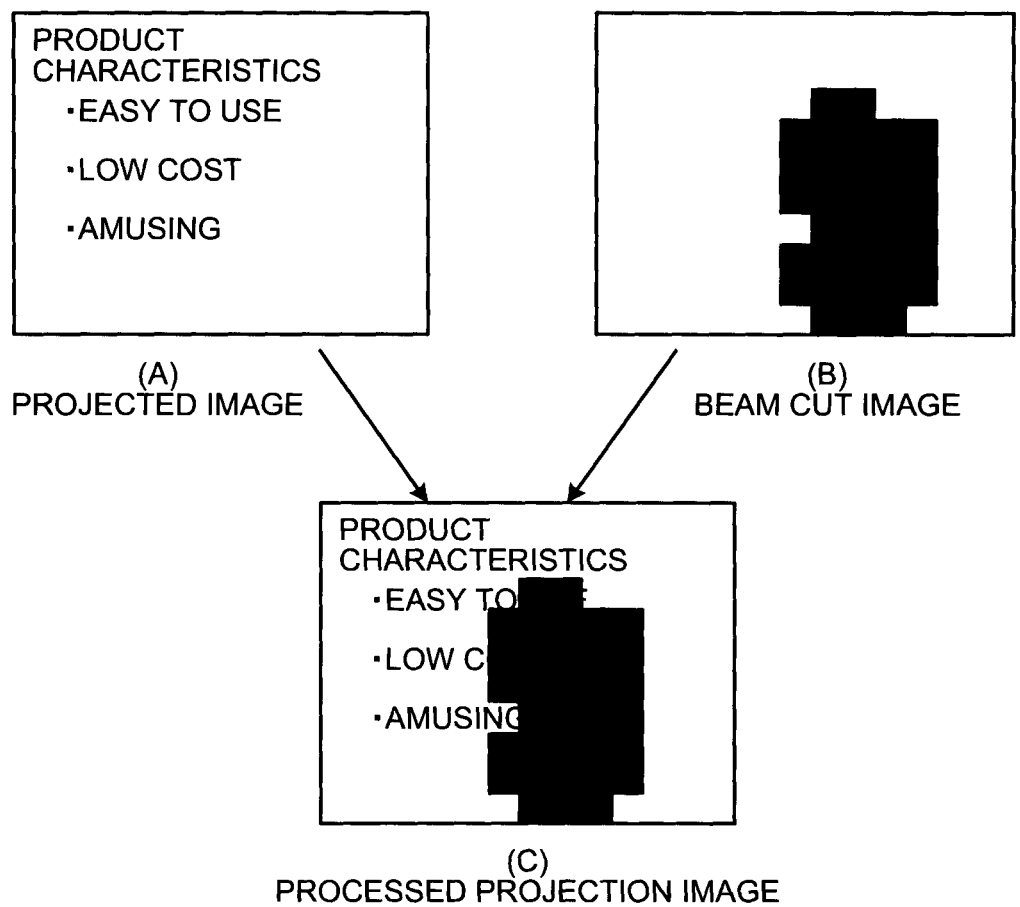
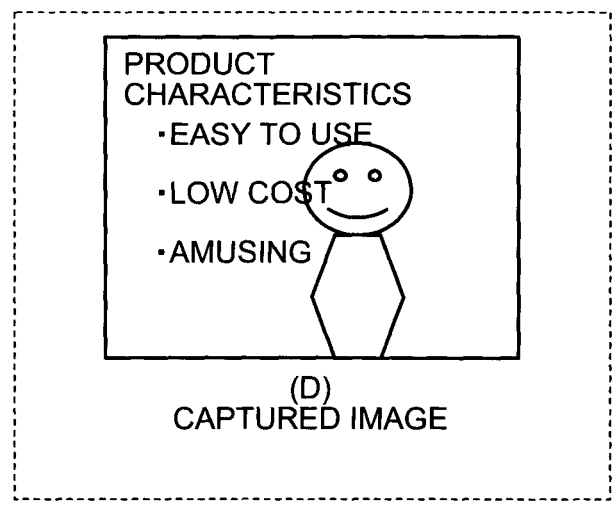

US 9,172,931 B2

PROJECTION DISPLAY DEVICE, INFORMATION PROCESSING DEVICE, PROJECTION DISPLAY SYSTEM, AND PROGRAM

TECHNICAL FIELD

The present invention relates to a projection display device, an information processing device, a projection display system, and a program.

BACKGROUND ART

In recent years, the importance of projecting units used for presentations at conferences, in which a large number of participants take part, etc. has increased. When a projector is used, the presenter prompts the participants to refer to an image projected onto a screen and explains contents of the image. An obstacle, such as a person or an object, that blocks the projected image may appear between the projector and the screen. For example, if the presenter stands in front of the screen to give an explanation, the presenter himself/herself becomes an obstacle. If there is an obstacle that reflects light (such as a PC or a plastic bottle), the light is reflected in a direction different from a projection direction of the projecting unit.

The presenter, when he/she is an obstacle, directly receives light from the projecting unit in his/her eyes or light reflected by an obstacle that reflects light is directly received in eyes, which is not desirable. For this reason, a technology has been proposed in which, when a person or an object enters a projection area, the projection light is reduced or blocked (Patent Document 1: Japanese Patent No. 3630015, Patent Document 2: Japanese Patent No. 4366631).

However, information on a position of a person is detected from image information in the technology disclosed in Patent Document 1 and this technology has a problem in that, in a projector system, it is extremely difficult to distinguish, when the projected image contains a person, a projected image and an actual presenter, etc., and thus the accuracy with which a person is extracted is low.

In the technology disclosed in Patent Document 2, a process of detecting entry into the projection area using infrared light and a process of reducing or blocking the projection light are performed. However, this technology cuts all the projection light, which leads to a problem in that projection at a part irrelative to the entering person also stops.

The present invention has been made in view of the above. An object of the present invention is to provide a highly accurate and effective anti-dazzle function.

DISCLOSURE OF INVENTION

The present invention is characterized in an image light projecting unit that projects image light on a screen; a distance measurement unit that measures distance to the screen; an obstacle detecting unit that detects an obstacle between the screen and the image light projecting unit on the basis of distance information obtained by the distance measurement unit and, according to a result of this detection, determines an adjustment area where the image light to be projected is to be adjusted; and a projection adjusting unit that adjusts the image light in the adjustment area.

According to the present invention, distance to a screen, which is a projection surface, is measured, from a result of this measurement, an obstacle is detected, and projection is adjusted in an area containing a detected obstacle, which leads to an effect whereby a highly accurate and effective anti-dazzle function can be provided.

BRIEF DESCRIPTION OF DRAWINGS

FIG. 5 is a diagram of exemplary reference plane information;

FIG. 6 is a diagram of exemplary distance data;

FIG. 19 is an explanatory view of exemplary processing of a beam cut image according to the third embodiment;

BEST MODE(S) FOR CARRYING OUT THE INVENTION

Embodiments of a projection display device, an information processing device, a projection display system, and a program according to the present invention will be described in detail below with reference to the accompanying drawings.

First Embodiment

Figure 1:
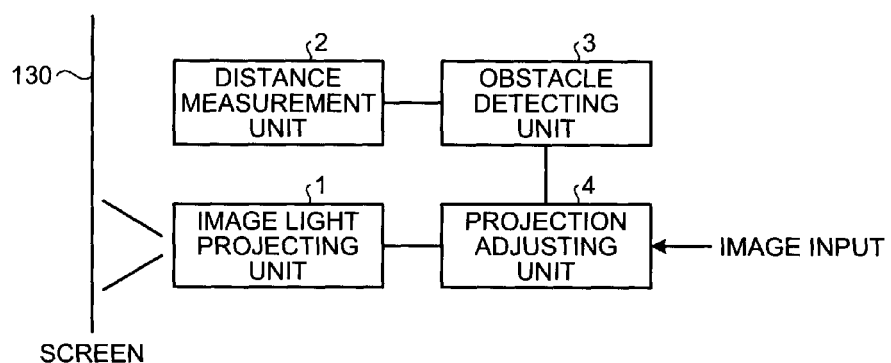
FIG. 1 is a diagram depicting a configuration of a projection display system according to a first embodiment.

FIG. 1 is a diagram depicting a configuration of a projection display system. As shown in FIG. 1, a projection display system includes an image light projecting unit 1 that projects an image onto the screen 130 on the basis of image data; a distance measurement unit 2 that measures distance to the screen 130 and an obstacle existing in front of the screen 130; an obstacle detecting unit 3 that receives, from the distance measurement unit 2, distance data as a result of distance measurement by the distance measurement unit 2 and detects the obstacle on the basis of the distance data; and a projection adjusting unit 4 to which the image data is input and that causes the image light projecting unit 1 to project image light on the basis of the image data while adjusting projection light projected by the image light projecting unit 1.

Figure 2:
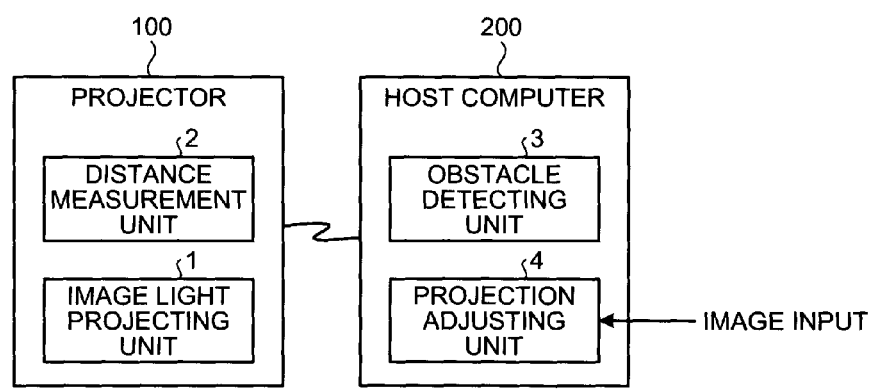
FIG. 2 is a diagram depicting another configuration of a projection display system.
Figure 3:
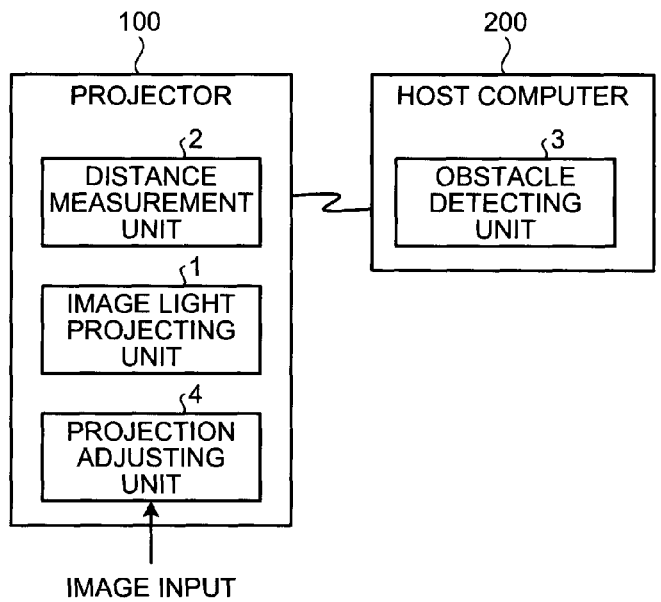
FIG. 3 is a diagram depicting another configuration of a projection display system.

In a first embodiment, the projection display system shown in FIG. 1 can be configured as a projection display device (projector) in which the image light projecting unit 1, the distance measurement unit 2, the obstacle detecting unit 3, and the projection adjusting unit 4 are integrated. In a second embodiment, a configuration may be used in which, as shown in FIG. 2, a projector 100 includes the image light projecting unit 1 and the distance measurement unit 2, and a host computer 200 (information processing device) that is connected to the projector 100 via a network (such as a LAN or the Internet), etc., includes the obstacle detecting unit 3 and the projection adjusting unit 4. In a third embodiment, a configuration may be used in which, as shown in FIG. 3, the projector 100 includes the image light projecting unit 1, the distance measurement unit 2, and the projection adjusting unit 4, and the host computer 200 that is connected to the projector 100 (projection display device) via a network, etc., includes the obstacle detecting unit 3.

Any known method may be used as the method of "distance measurement" performed by the distance measurement unit 2. Typical methods include a method of measuring the distance with two cameras by utilizing parallax and a method of measuring time after the radiation of infrared light, etc. until reflected light is received from an object. Functions of the obstacle detecting unit 3 and the projection adjusting unit 4 (detailed descriptions will be given below) can be achieved by a controlling unit constructed by a CPU(s) and a memory(s) of the projection display device and/or a host computer, in which the obstacle detecting unit 3 and/or the projection adjusting unit 4 is/are provided, and a control program thereof.

In the present embodiment, image data to be projected is bitmap data. Distance data (described later) used in the present embodiment can be acquired as bitmap data as well. The sizes of these bitmap data do not have to be equal. For example, the bitmap data of the distance data may have a lower resolution. In the present embodiment, to distinguish these bitmap data, a bitmap of the image data to be projected is referred to as a bitmap A (BA) and bitmap in which the result of measuring the distance (distance data) is stored is referred to as a bitmap B (BB) (see FIG. 8). Here, points on the BB are also referred to as pixels and thus pixels on the BA are referred to as BA pixels and pixels on the BB are referred to as BB pixels.

Figure 4:
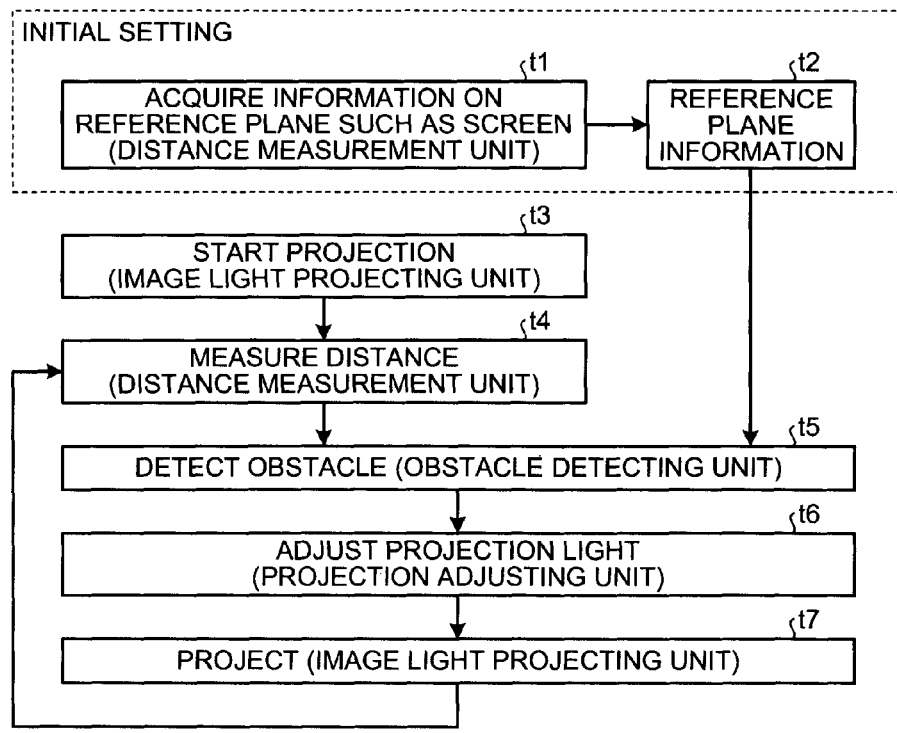
FIG. 4 is a diagram of a (outline) flow of processing performed by the projection display system according to the first embodiment.

FIG. 4 depicts a (outline) flow of a process performed by the projection display system.

Initial setting is performed at a time when needed, for example, at a time when "power is turned on" or a predetermined "initial setting button" is pressed or in each of cases described below. In the initial setting, data of distance to the screen 130 (the distance data), which is acquired by the distance measurement unit 2, is acquired as reference plane information (FIG. 5) (t1) and is set in a storage unit (not shown), such as a memory, provided in the distance measurement unit 2 or the projector 100 (t2).

The initial setting may be performed automatically in this way. Alternatively, a process may be performed in which whether to perform the initial setting is asked to a user and the initial setting is performed only if the user allows the initial setting. In the initial setting, the distance measurement unit 2 acquires three-dimensional information on a three-dimensional space consisting of X, Y and Z axes (the X-axis is horizontal, the Y-axis is vertical, and Z-axis is depth) and stores the three-dimensional information as reference plane information. Specifically, as shown in FIG. 5, the reference plane information includes information of the depth (information of distance) at each X-Y position in an area. FIG. 5 illustrates an example in which the screen 130 is about 100 cm distant.

When the image light projecting unit 1 projects the image light (t3), the distance measurement unit 2 measures distance at that time (t4). For example, the distance data shown in FIG. 6 is acquired in contrast with the reference plane information shown in FIG. 5.

The obstacle detecting unit 3 detects an obstacle from data of distance measured by the distance measurement unit 2 and the reference plane information (the distance data) that has been set in the initial setting (t5). When an obstacle is detected, an adjustment area where the image light to be projected is adjusted is determined in accordance with a detection result (details will be described later).

The projection adjusting unit 4 adjusts the projection light in accordance with the result of detection performed by the obstacle detecting unit 3 (determined adjustment area) (t6) and the image light projecting unit 1 projects the adjusted image light (t7). Then, process returns to the above-described t4.

In the projection display system according to the present embodiment, also in a case when it is determined that the positional relationship between the image light projecting unit 1 and the screen 130 has largely changed, the above-described initial setting is performed. It is conceivable that such a case occurs specifically in the following three cases: (1) when the image light projecting unit 1 is moved, (2) when the distance measurement unit 2 is moved, and (3) when the screen 130 moves or is moved by wind.

The obstacle detecting unit 3 according to the present embodiment detects an obstacle and, in addition to this obstacle detection, determines whether there is movement (change) in the positional relationship between the image light projecting unit 1 and the screen 130. Accordingly, when the obstacle detecting unit 3 determines that there is movement in the positional relationship between the image light projecting unit 1 and the screen 130, the above-described initial setting is performed. The movement detected by the obstacle detecting unit 3 corresponds to the above-described cases (1) and (3) and, if the image light projecting unit 1 and the distance measurement unit 2 are integrated, also corresponds to the case (2). Other methods of detecting the cases (1) to (3) include, for example, a method in which a movement detecting unit, such as an acceleration sensor, is arranged on the image light projecting unit 1, the distance measurement unit 2 and the screen 130 to detect movement of each thereof to determine presence or absence of the movement.

Detection of movement in the positional relationship between the image light projecting unit 1 and the screen 130, which is performed by the obstacle detecting unit 3, is performed specifically by pre-setting a threshold that is different from that used to detect an obstacle and determining that there is a movement in the positional relationship if the threshold is not exceeded. When an obstacle is detected in the example of FIG. 6, by taking an absolute value of a difference between a value in the distance data in FIG. 6 and a corresponding value in the reference plane information as a distance difference and setting the threshold of the distance difference for obstacle detection to "30" cm, parts surrounded by dotted lines in FIG. 6 can be extracted as an obstacle as described below. On the other hand, for example, a threshold of the distance difference is set to "10" cm and then it is determined that the movement in the positional relationship between the image light projecting unit 1 and the screen 130 has taken place when the distance difference, is equal to or less than 10 cm in the X-Y coordinates. Taking measurement error into account, it is not determined that the movement in the positional relationship has taken place when the distance difference is equal to or less than 1 cm. Because the obstacle detection performed by the obstacle detecting unit 3 has to follow movement of a human, etc., obstacle detection is preferably performed at least a few times per second and possibly more than 10 times per second.

Figure 7:
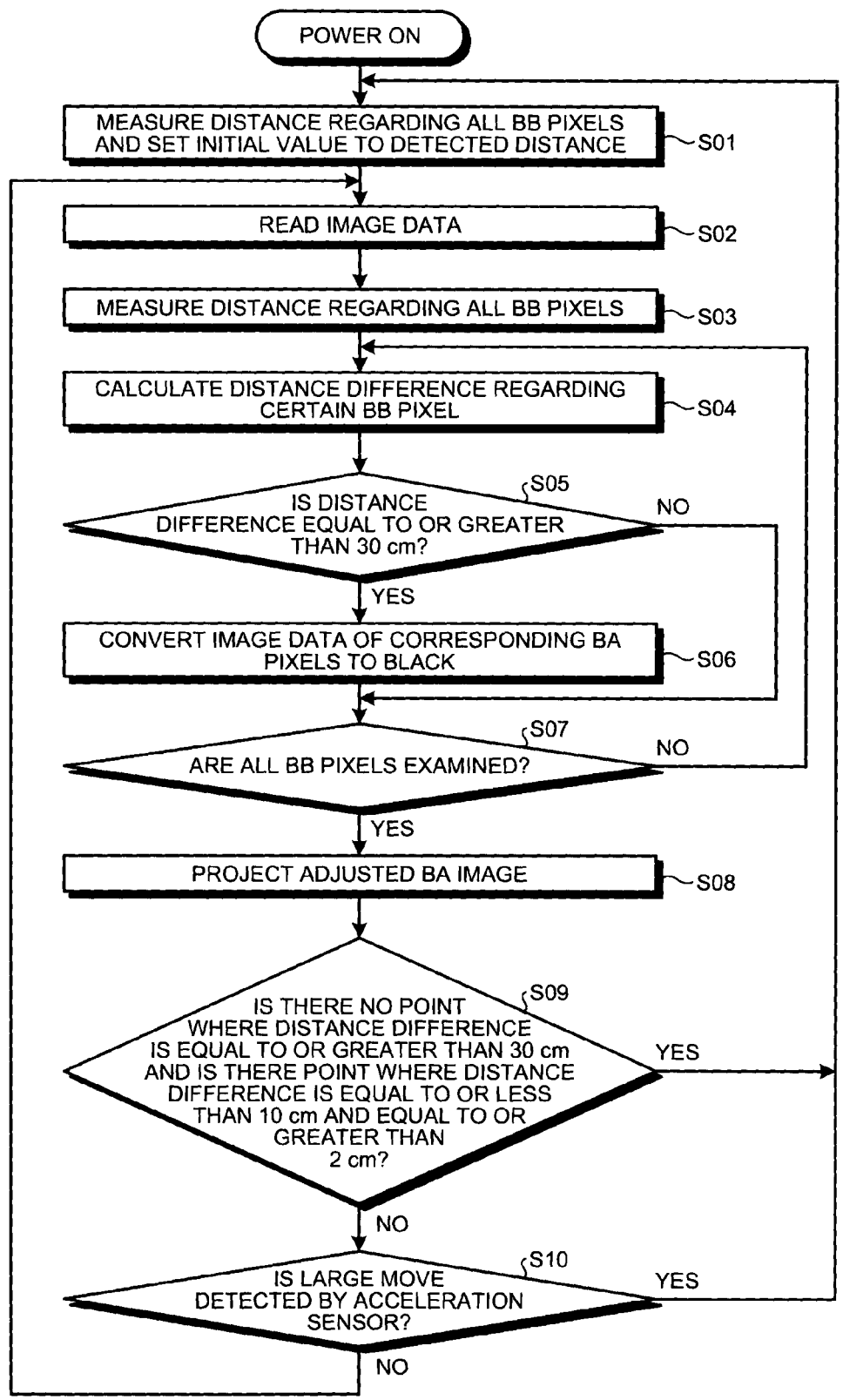
FIG. 7 is a flowchart illustrating a series of operations performed by the projection display system according to the first embodiment.

A series of operations performed by the projection display system will be described using a flowchart of FIG. 7.

Initial setting is performed when "power is turned on" (power on), the predetermined "initial setting button" is pressed, or the movement is detected in any of the above-described cases (1) to (3). Specifically, the distance measurement unit 2 performs the distance measurement to a space to the screen 130 with respect to all of the BB pixels and sets the obtained values as initial values (step S01).

Subsequently, when an operation to start projection is performed, the projection adjusting unit 4 reads image data (BA) (step S02).

The distance measurement unit 2 then performs the distance measurement to the space to the screen 130 with respect to all the BB pixels at this time (step S03).

The obstacle detecting unit 3 then calculates the distance difference (describe above) with respect to a certain BB pixel (step S04).

When the distance difference is equal to or greater than 30 cm, which is the threshold (in this case, the obstacle detecting unit 3 determines that there is an obstacle and a relevant point makes an adjustment area where image light to be projected is adjusted) (YES at step S05), the projection adjusting unit 4 converts image data of BA pixels corresponding to the BB pixel to, for example, black (projection light adjustment) (this causes luminance of projected image light to be at a black level) (step S06). If not (No at step S05), the process goes to step S07. Here, the distance difference is calculated per pixel and, when the distance difference is equal to or greater than the threshold of 30 cm, the image data of the corresponding BA pixels is converted. Alternatively, after the distance differences are all calculated, the image data of BA pixel(s) may be converted when it has been determined that the distance difference(s) with respect to the BA pixel(s) has/have been equal to or greater than the threshold of 30 cm.

Until all BB pixels are examined, the processes at steps S04 to S07 are repeated (NO is determined at step S07, then the process goes to step S04). After all BB pixels are examined (YES at step S07), the process goes to step S08.

The image light projecting unit 1 projects an image of BA that has been adjusted (step S08).

The obstacle detecting unit 3 determines, on the basis of the distance differences calculated at step S04, whether there is a point (BB pixel) where the distance difference is equal to or less than 10 cm and equal to or greater than 2 cm while a point (BB pixel) where the distance difference is equal to or greater than 30 cm is absent. When there is such a pixel (YES at step S09), the process returns to step S01 and the initial setting is performed.

When NO is determined at step S09, if an acceleration sensor is provided as the movement detecting unit as described above, it is determined whether the acceleration sensor has detected a large movement and, when a large movement is detected (YES at step S10), the process returns to step S01 and processes started from the initial setting are performed. If not (NO at step S10), the process returns to step S02 and processes started from the image data reading process are performed.

Obstacle detection performed by the obstacle detecting unit 3 and projection light adjustment performed by the projection adjusting unit 4 will be further described here.

When a person stands between the screen 130 and the image light projecting unit 1, signals from the distance measurement unit 2 change as shown in FIG. 6. In other words, when the person stands between the screen 130 and the image light projecting unit 1, the distance from the image light projecting unit 1 shortens due to the standing person and thus distance of approximately 50 cm is measured by the distance measurement unit 2 in the example of FIG. 4. Therefore, by calculating difference (the distance difference) from the reference plane information shown in FIG. 5 and determining whether there is an obstacle using the predetermined threshold, an obstacle is extracted. In the example of FIG. 6, an obstacle can be detected by setting the threshold to 30 cm. Not only a person but also a PC or a plastic bottle placed between the screen 130 and the image light projecting unit 1 can be detected. The projection adjusting unit 4 adjusts an image input (BA) for an area where the obstacle is detected in this way. At the above described step S06, the projection adjusting unit 4 adjusts the image input (BA) by converting pixels of the area where the obstacle is detected by the obstacle detecting unit 3 to black. Other than projecting corresponding pixels as black as described above, a configuration may be used in which data of corresponding pixels is converted such that intensity of projection light reduces. Also in this manner, anti-dazzle effect can be obtained. Furthermore, the light reflected from an obstacle, such as a PC or a plastic bottle, can be reduced.

Figure 8:
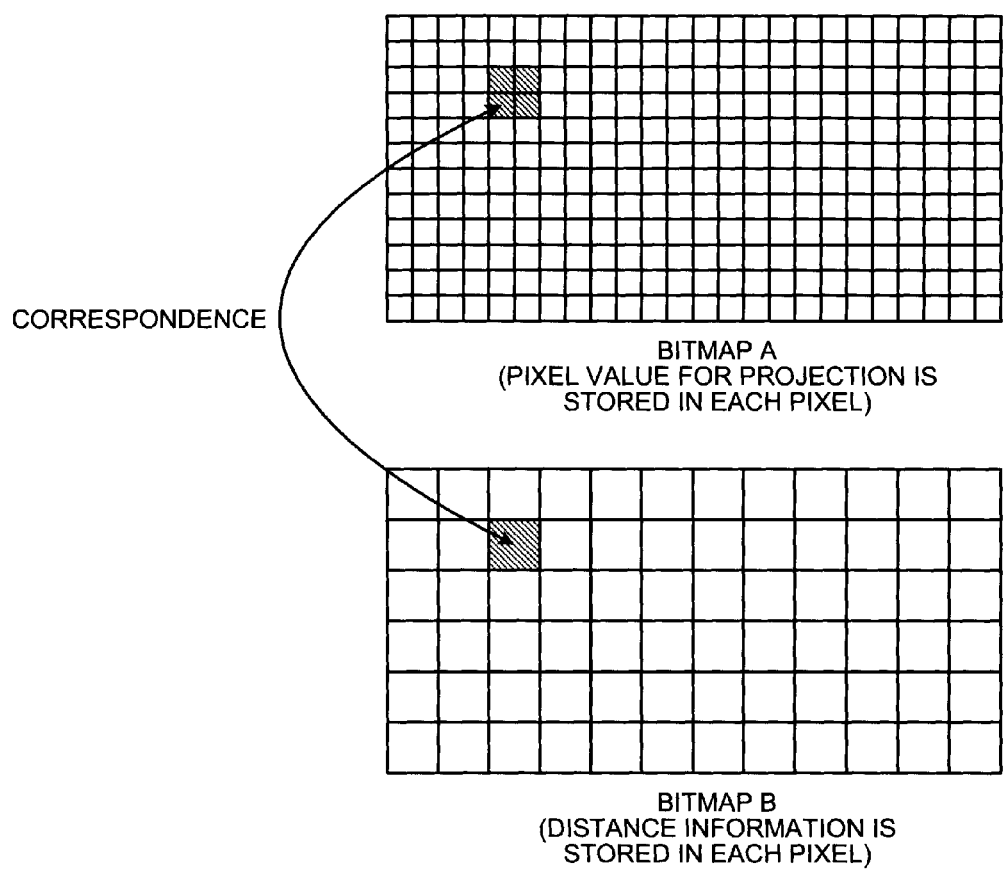
FIG. 8 is a diagram depicting a bitmap A and a bitmap B and the relationship between the bitmap A and the bitmap B.
Figure 9:
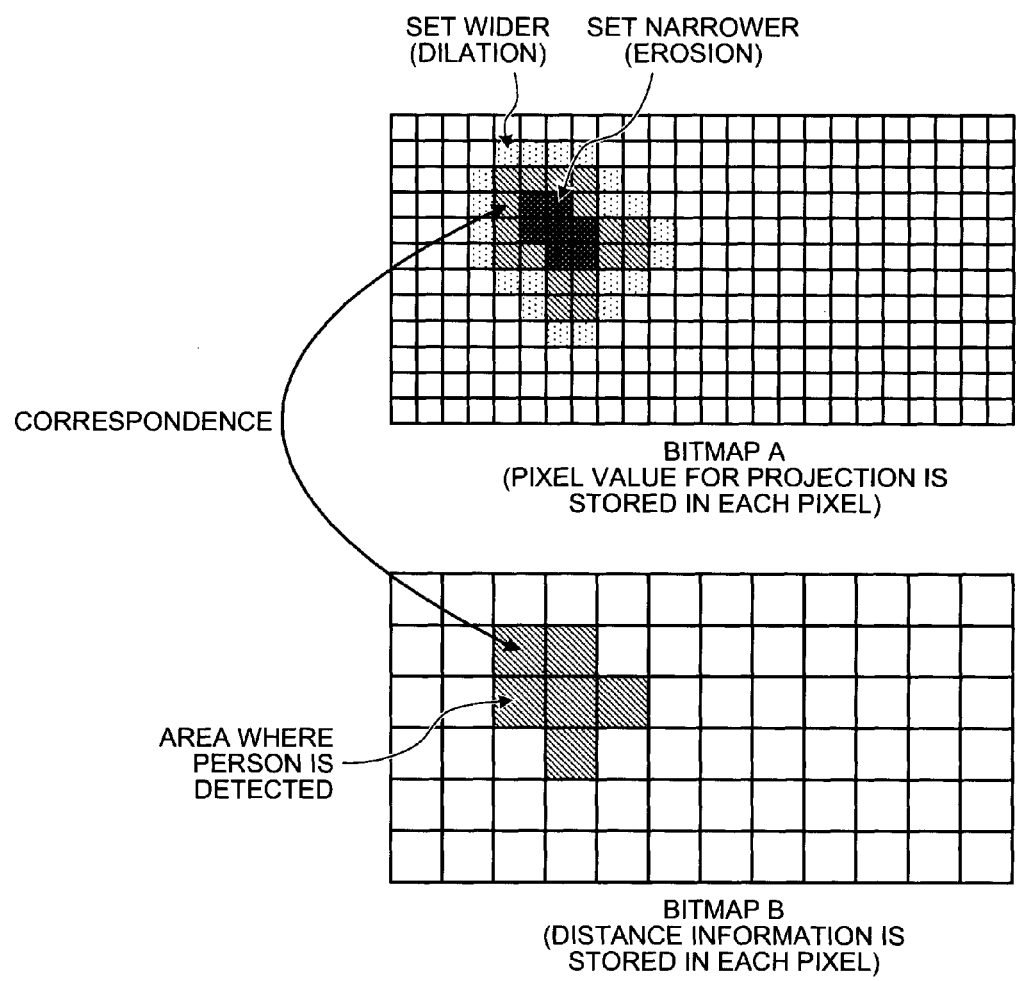
FIG. 9 is a diagram illustrating a process of setting an area, where black pixels are set, in the bit map A so as to be either wider or narrower.

Regarding correspondence between BA and BB positions, because the resolution of BA is double that of BB in the example of FIG. 8, four pixels of 2×2 on BA are located in a position corresponding to one pixel on BB. Accordingly, when a pixel on BB where the distance shortens more than 30 cm, which is the threshold, is detected, the corresponding four pixels on BA are set to black.

Projection light adjustment may be performed in a wider area or a narrower area obtained by slightly widening or narrowing circumference of the extracted obstacle. For example, a wider area is obtained by including, in an area to be set to black at step S06, pixels surrounding the corresponding pixels and having a width of few pixels from the circumference of the corresponding pixels. In this case, a little margin is created around the person, which is an obstacle, which increases the anti-dazzle effect. The area may be conversely narrowed.

The area can be narrowed by provisionally determining pixels (pixels corresponding to an obstacle) to be converted to black and by causing them to be subjected to a known erosion process. If a known dilation process is used here, the area can be set wider as described above.

Figure 10:
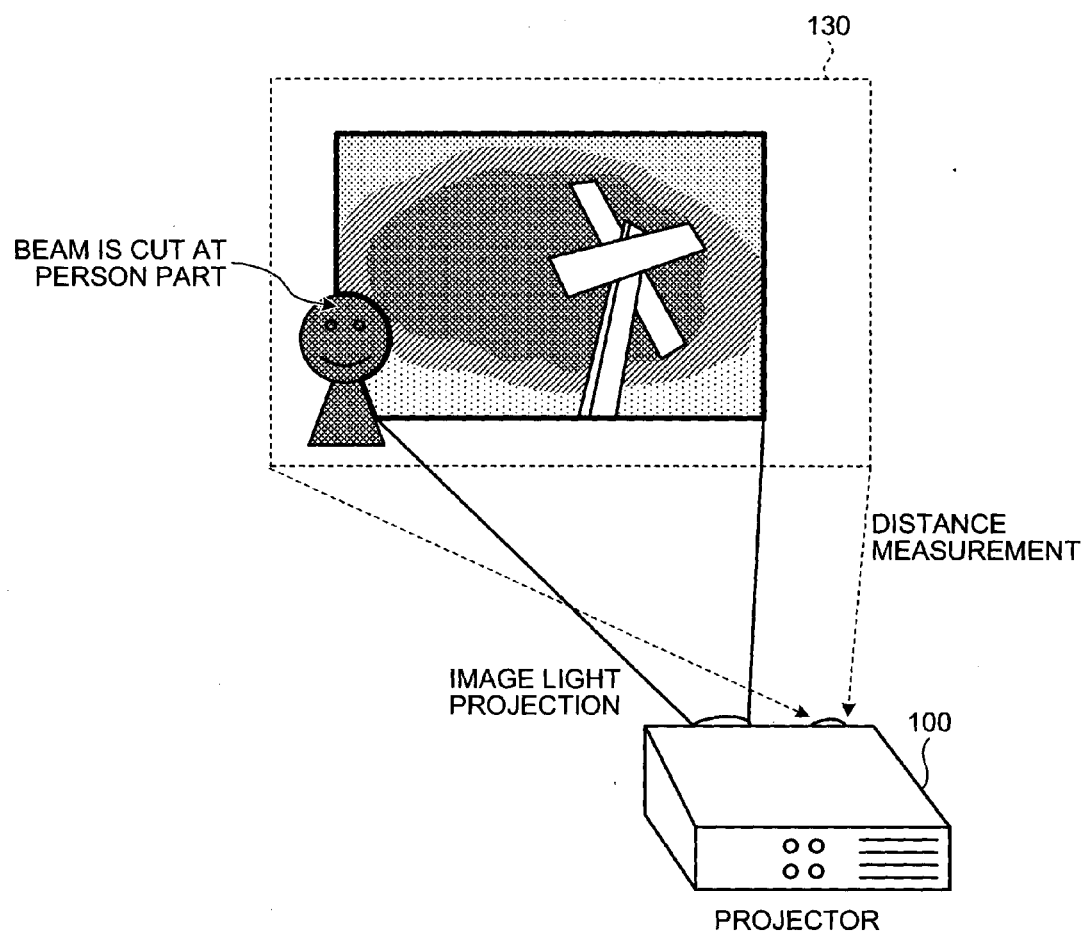
FIG. 10 is a diagram of exemplary use of the projection display system according to the first embodiment.

By detecting an obstacle and adjusting projection light depending on the obstacle in the above described manner, image light can be projected to avoid lighting the obstacle (see FIG. 10). Accordingly, an anti-dazzle effect can be obtained.

Second Embodiment

A projection display system of a second embodiment will be described here. A hardware configuration of the projection display system according to the second embodiment is similar to that according to the first embodiment and thus some descriptions thereof will be omitted and different points will be described here.

Figure 11:
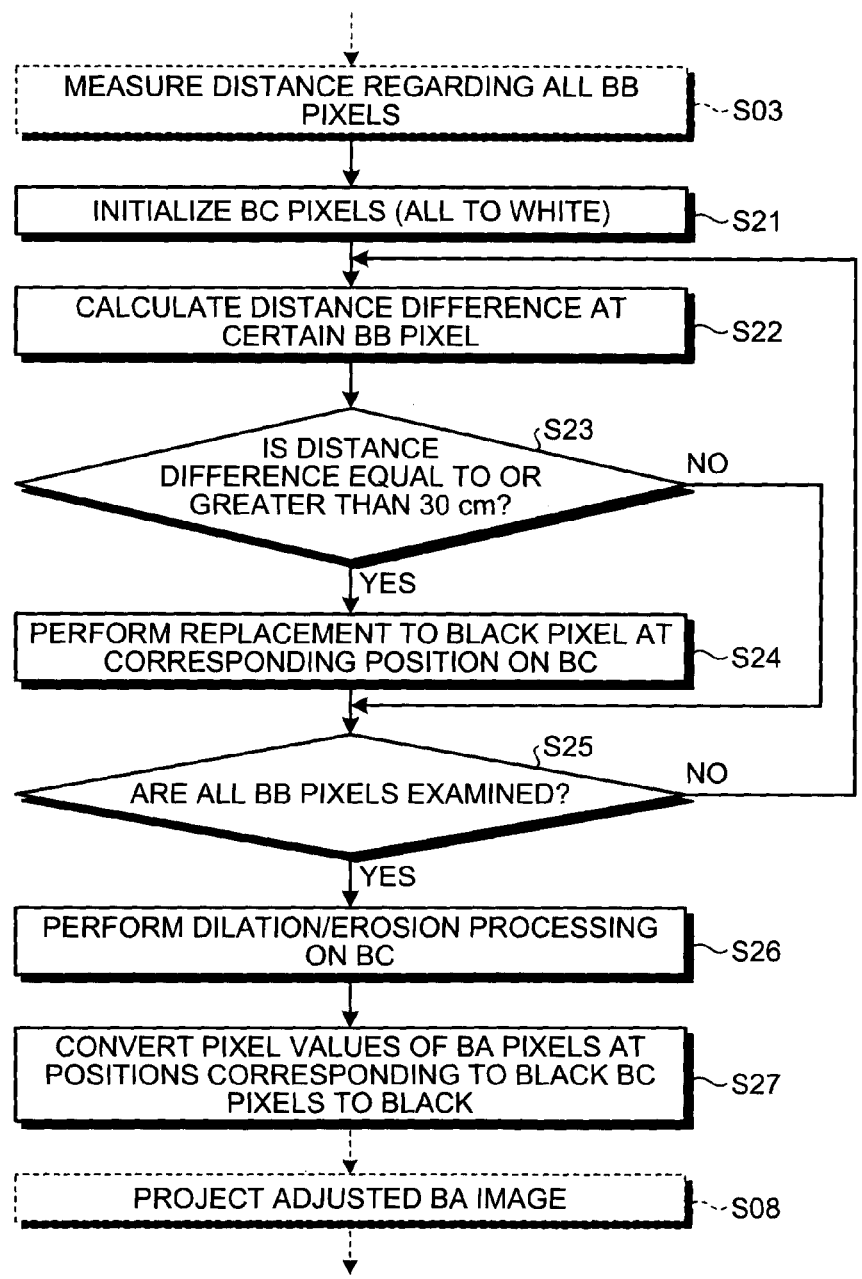
FIG. 11 is a flowchart illustrating a series of operations performed by a projection display system according to a second embodiment.

In the present embodiment, a mask image BC having the same resolution as that of BA is used. Shown in the flowchart of FIG. 11 is processing performed using the mask image BC. The processes at S21 to S27 are performed after step S03 in the flowchart described using FIG. 7 and the processes at and after step S08 are performed after step S27.

After the process at step S03, the projection adjusting unit 4 initializes all pixels of the mask image BC to white pixels (step S21).

The obstacle detecting unit 3 then calculates the distance difference with respect to a certain BB pixel (step S22).

When the distance difference is equal to or greater than 30 cm, which is the threshold (in this case, the obstacle detecting unit 3 determines that there is an obstacle) (YES at step S23), the projection adjusting unit 4 performs replacement to a black pixel at the corresponding position on BC (step S24). If not (NO at step S23), the process goes to step S25.

Until all BB pixels are examined, the processes at steps S22 to S25 are repeated (NO is determined at step S25, then the process goes to step S22). After all BB pixels are examined (YES at step S25), the process goes to step S26.

A dilation process or an erosion process is performed on the mask image BC obtained by examining all BB pixels and replacing required parts with black pixels (step S26).

Pixel values of BA pixels at positions corresponding to those of black pixels on the processed BC (black BC pixels) are then converted to black (step S27). Thereafter, the processes at and after step S08 will be performed.

Figure 12:
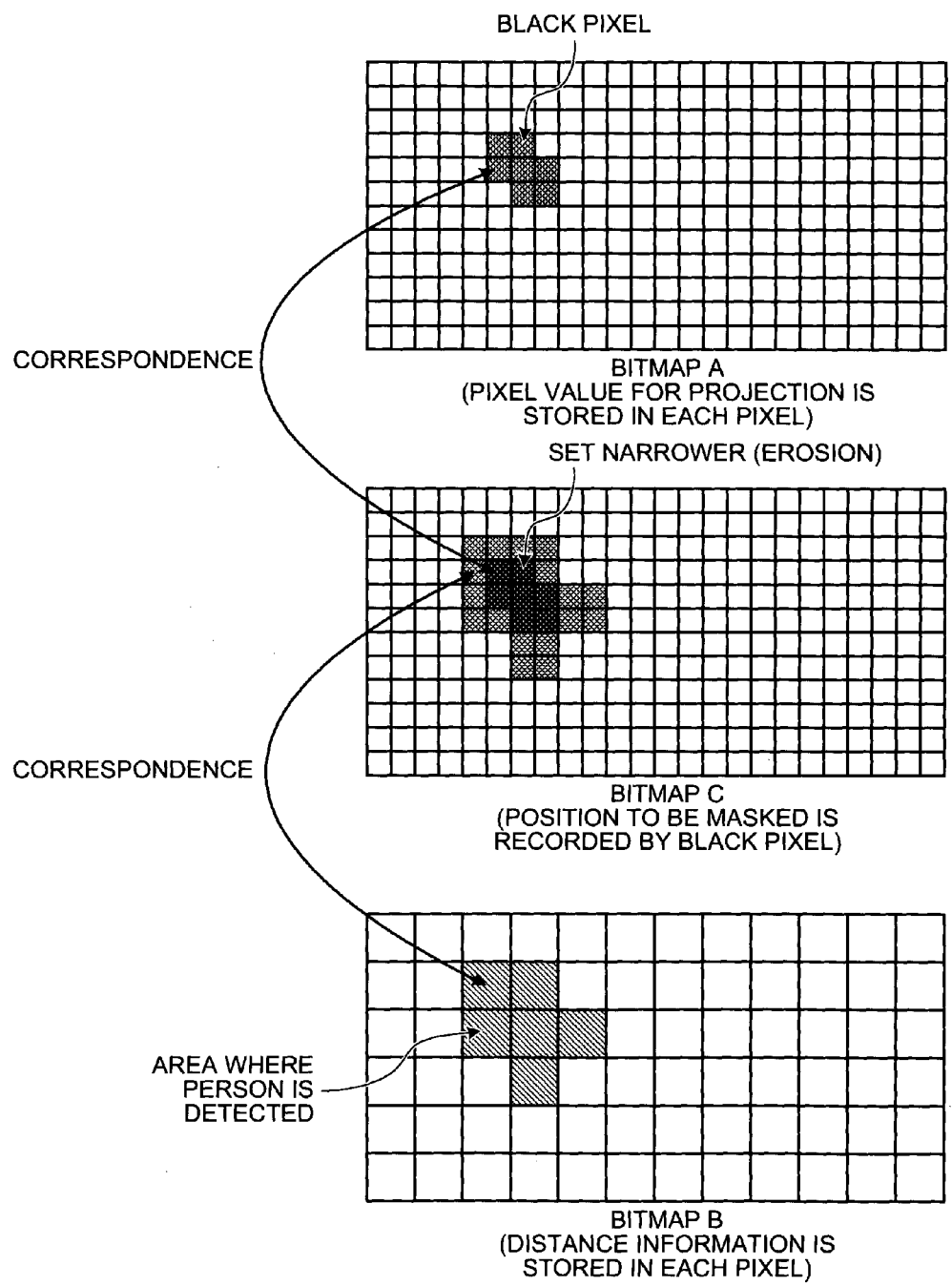
FIG. 12 is a diagram illustrating a process of setting an area, where black pixels are set, in a bitmap A so as to be narrower according to the second embodiment.
Figure 13:
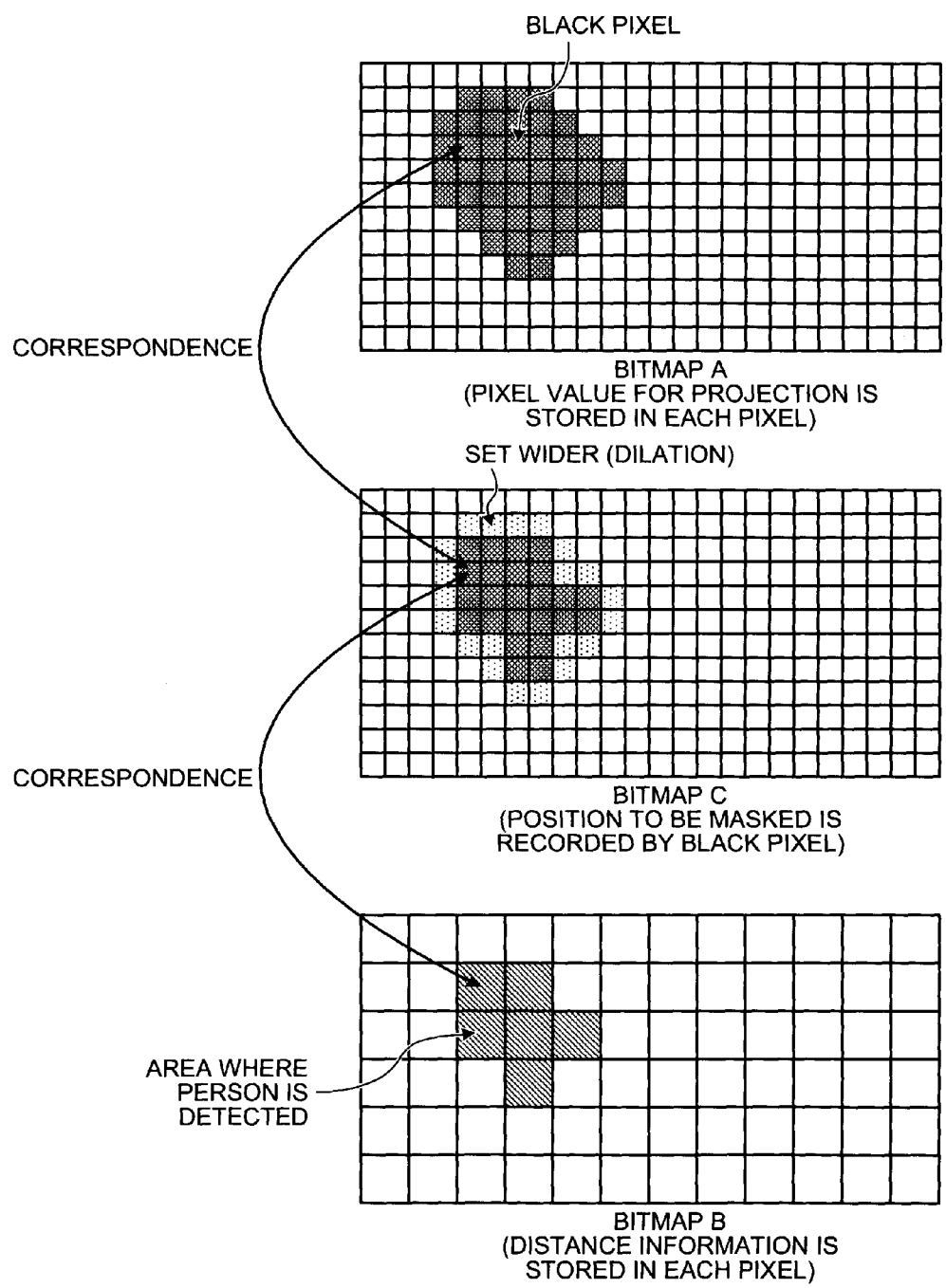
FIG. 13 is a diagram illustrating a process of setting an area, where black pixels are set, in the bitmap A so as to be wider according to the second embodiment.

FIG. 12 shows a concept of the erosion process to BC and FIG. 13 shows a concept of the dilation process to BC. In the present embodiment, as described above, the mask image BC corresponding to an area where a person is detected is created first and, on the basis of BC obtained by performing the dilation process and the erosion process, an area on BA to be converted to black pixels is determined.

The projection display system of the embodiment is described above. As described above, the projection display system is configured to project image light while detecting an obstacle between the projector 100 (projection display device) and the screen 130 (=presenter, a face area and an eye area of the presenter, a conference participant, a PC or a plastic bottle), and adjusting projection at a part corresponding to the obstacle. Accordingly, a presentation environment where a presenter or a conference participant is not dazzled can be provided. Furthermore, light from the projection display device is prevented from reflecting on a PC or a plastic bottle as an obstacle, and reflecting in a direction different from a direction in which the light is projected. Furthermore, use of a laser as a light source for a projection display device has been considered. In this case, a presentation environment that is not only not dazzling but also safer can be provided.

Third Embodiment

Figure 14:
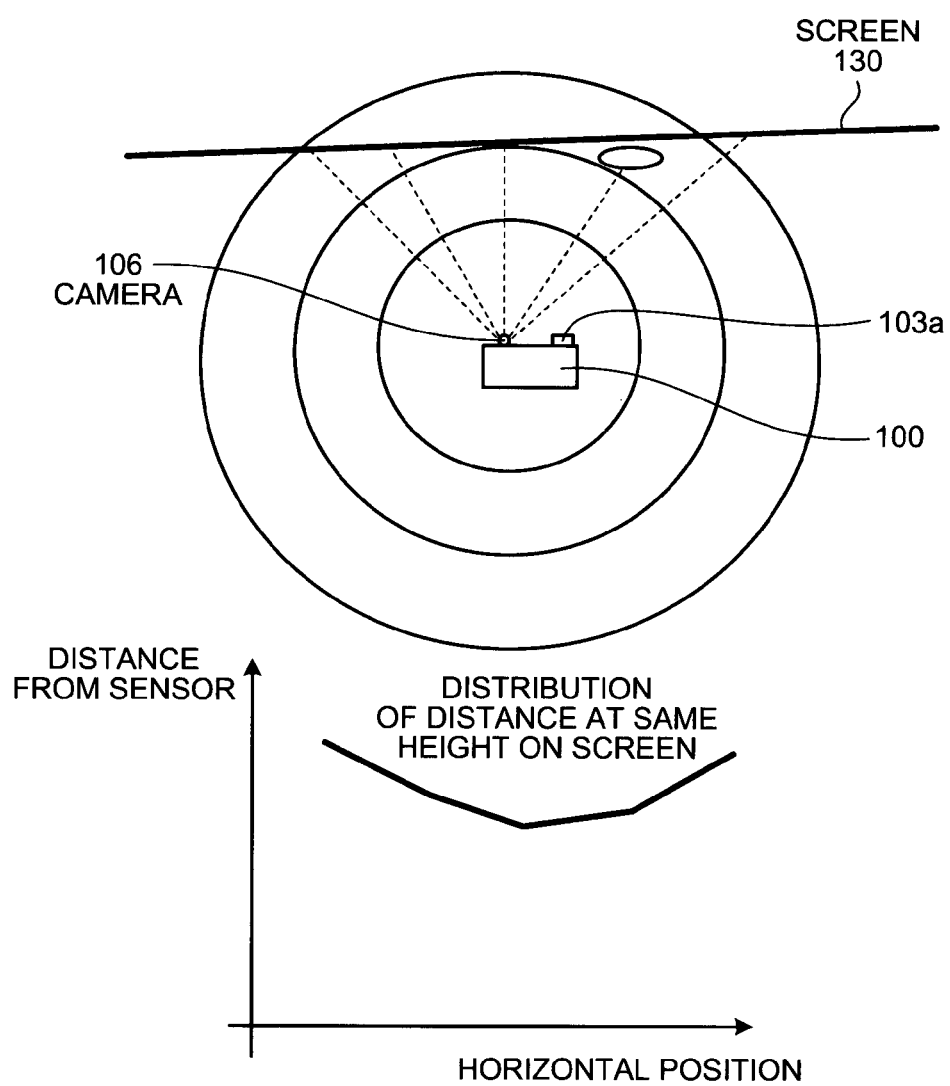
FIG. 14 is an explanatory view depicting an example of measuring, from one point, distance between a screen and a radiation port.
Figure 15:
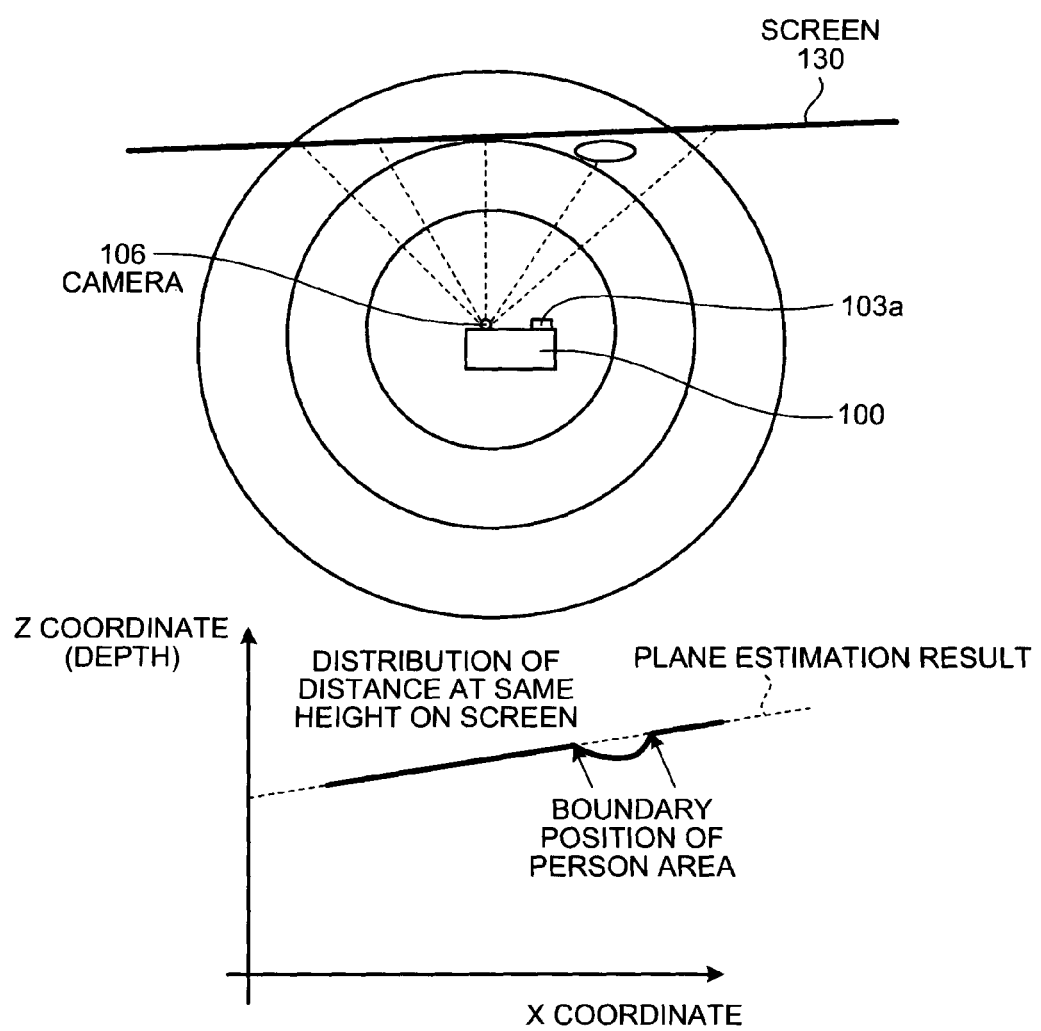
FIG. 15 is an explanatory view depicting an example of three-dimensional position estimation and plane estimation.

As described in FIG. 14, when distance between the surface of the screen 130 and the projector 100 is measured from one point, because the distance to the screen 130 varies depending on a location (refer to a lower part of FIG. 14), a person and the screen cannot be distinguished easily, particularly in a case of a short focus projecting unit. In FIG. 14, an image projected onto the screen 130 is captured using a camera (sensor) from one point and distances between the sensor and the screen 130 are determined on the basis of the captured image, then distribution of the distances at locations at the same height on the screen, is as shown at a lower part of FIG. 14. When three-dimensional coordinates of the points where the distance measurement is performed are obtained and plane estimation is performed, a plane occupying a large part of an area where the distance measurement is performed and others can be distinguished as shown in FIG. 15 and accordingly a projection target area can be set at a boundary of the plane. In FIG. 15, an image projected onto the screen 130 is captured using cameras at two different locations, distance between the sensor and the screen 130 is acquired from captured images, and plane estimation is performed from the distribution of distances at the same height on the screen 130, thereby estimating a boundary position of an area where a person is located. In this case, it is satisfactory if positions distant from the plane by a certain amount (for example, 5 cm) are defined as being outside the screen 130 and a boundary thereof is set to a boundary position of an area onto which projection is to be performed.

Figure 16:
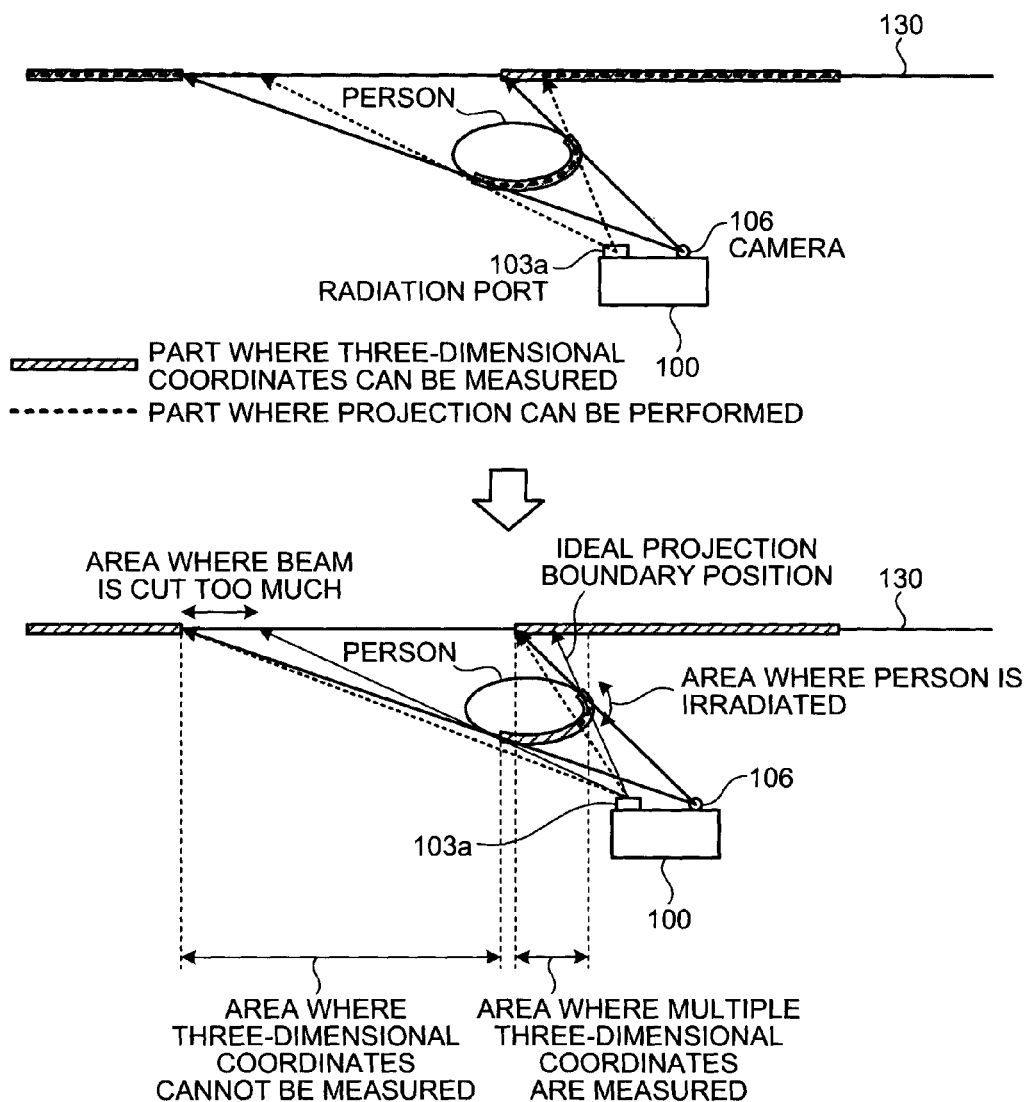
FIG. 16 is an explanatory view depicting an image captured when a camera is arranged on the right.
Figure 17:
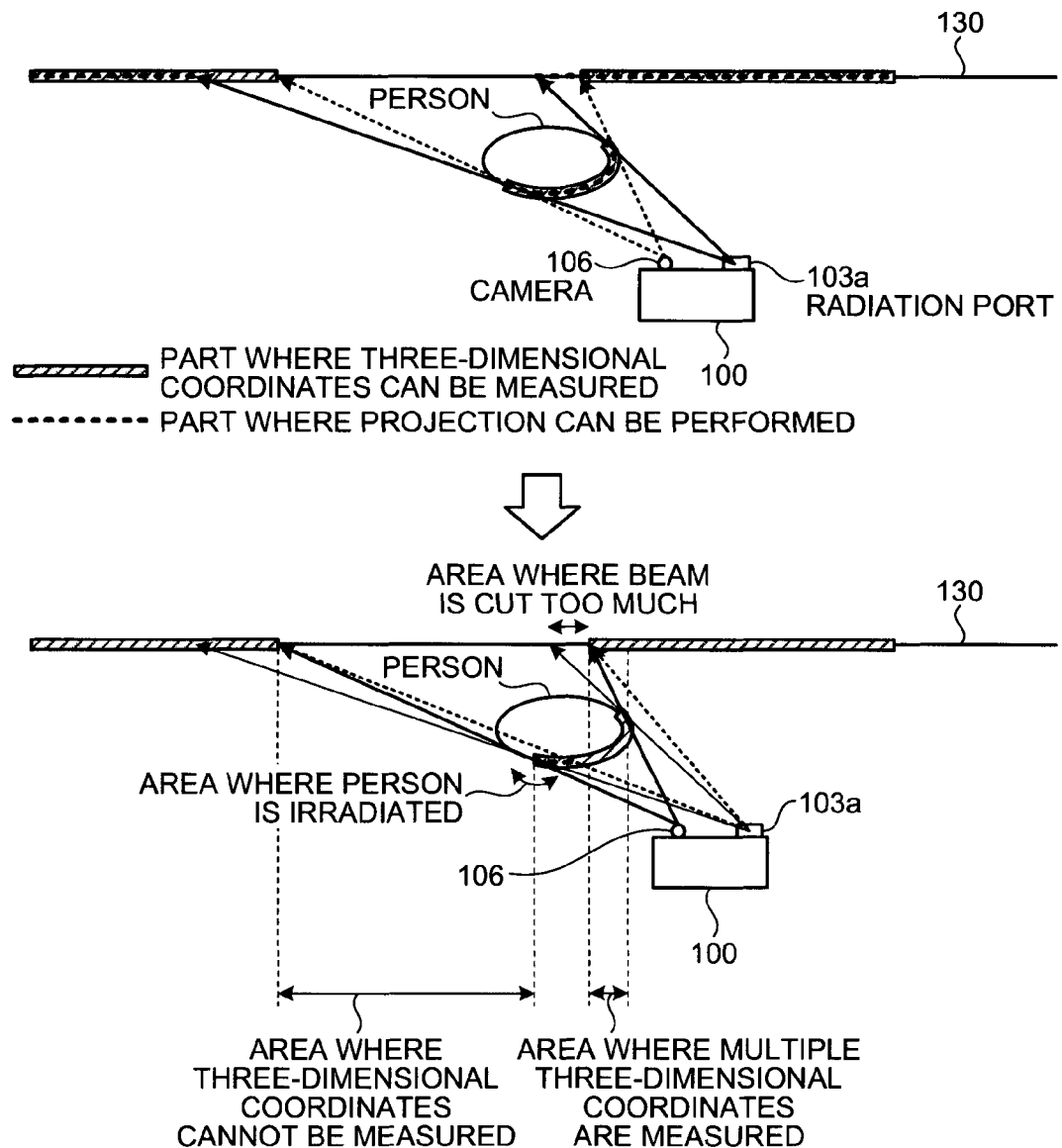
FIG. 17 is an explanatory view depicting an image captured when a camera is arranged on the left.

When there is difference between a position where projection light is emitted and a position of the camera (distance measurement sensor), distortion is caused in a beam cut area (an area where a beam projected to there should be cut). As shown in FIGS. 16 and 17, the beam cut area is narrowed on the projection port 103a (a position where projection light is emitted, see FIG. 18) side and the cut area is widened on the camera side. Although, FIG. 16 and FIG. 17 show a case where horizontal distortion is caused, the same applies to a case where vertical distortion is caused.

More appropriate beam cut is performed by adding a movement detection function to the above-described processing, increasing the beam cut area in a movement direction, and reducing the beam cut area in an opposite direction.

Figure 18:
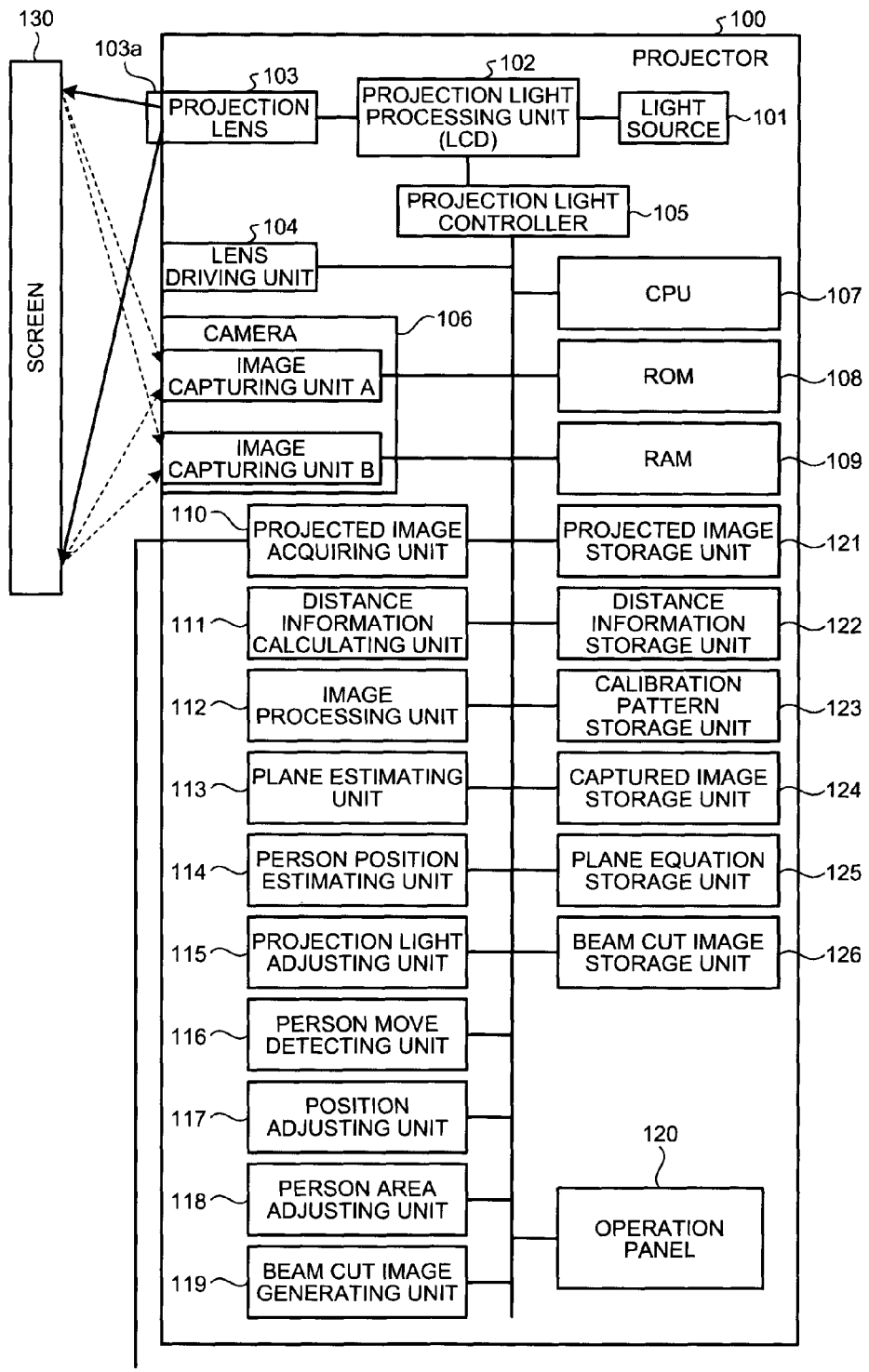
FIG. 18 is a block diagram of an exemplary functional configuration of a projector according to a third embodiment.

A specific configuration and specific operations regarding the above-described overview of an operation example will be described here. FIG. 18 is a block diagram of an exemplary function configuration of a projecting unit according to the third embodiment. As shown in FIG. 18, the projecting unit includes a light source 101, a projection light processing unit 102, a projection lens 103 comprising the projection port (radiation port) 103a at its tip, and a lens driving unit 104, which are all controlled by a projection light controller 105.

The projector 100 includes some unit to measure distance, in this example, a camera 106 serving as the distance measurement unit that comprises stereo cameras of an image capturing unit A and an image capturing unit B in order to determine distance from an intersection point on the basis of images captured by the camera 106 to a base point of the distance measurement. According to a control program stored in a ROM 108, a CPU 107 performs functions of a projection image acquiring unit 110, a distance information calculating unit 111, an image processing unit 112, a plane estimating unit 113, a person position estimating unit 114, a projection light adjusting unit 115, a person movement detecting unit 116, a position adjusting unit 117, a person area adjusting unit 118, and a beam cut image generating unit 119. A RAM 109 is used as a working memory during control by the CPU 107. The projector 100 further includes, as storage units, a projection image storage unit 121, a distance information storage unit 122, a calibration pattern storage unit 123, a captured image storage unit 124, a plane equation storage unit 125, and a beam cut image storage unit 126. The reference number 120 denotes an operation panel.

The camera 106 captures an image projected onto a surface of the screen 130 with the stereo cameras of the image capturing unit A and the image capturing unit B and measures distance from an area including a projection surface to the projector 100. The distance information calculating unit 111 calculates information of distances at multiple points (distance information) from multiple images. The image processing unit 112 processes a projection images according to the captured projected image and a beam cut image. The plane estimating unit 113 approximately estimates the plane corresponding to the projection surface from the distance information. The person position estimating unit 114 estimates a position of a person on the basis of the plane and the distance information. The projection light adjusting unit 115 adjusts the projection light at the position of the person. Using these functions, person detection using plane estimation and antidazzle are realized.

The projection light adjusting unit 115 that adjusts the projection light at a position of the person is affected by a function of the position adjusting unit 117 that adjusts the position according to positional relationship between the distance measurement unit and the projecting unit. A position where a beam is cut is adjusted according to the positional relationship between the projection port 103$a$ and a distance measurement port.

The projection light adjusting unit 115 that adjusts the projection light at a position of a person is affected by a function of the person movement detecting unit 116 that detects movement of the person to adjust the projection light according to the movement of the person. In other words, the position where a beam is cut is adjusted according to a result of detection of movement of the person.

The person area adjusting unit 118 adjusts a person area such that the person area is wider in a case where the movement is faster and the person area is narrower in a case where the movement is smaller. In other words, the wider an area where beam is cut is, the faster the movement of the person is.

The beam cut image generating unit 119 generates an image of an area where a beam is to be cut (the person area) and stores it in the beam cut image storage unit 126.

A projection image that is externally input to the projection image acquiring unit 110 via the host computer 200 is stored in the projection image storage unit 121. The distance information storage unit 122 stores information on distance between a plane of the screen 130 and the projection port 103$a$ (radiation port) of the projector 100. The calibration pattern storage unit 123 stores a calibration pattern used for calibration. The captured image storage unit 124 stores a captured screen image. The plane equation storage unit 125 stores an equation (calculation formula) in processing of the plane estimation on the basis of captured images as described below.

Operation Example 1

FIG. 19 is an explanatory view of exemplary beam cut image processing according to the third embodiment. In FIG. 19, (A) indicates a projected image, (B) indicates a beam cut image, (C) indicates a processed projection image, and (D) indicates a captured image, respectively. The exemplary beam cut image processing is shown in the following flowchart.

Figure 20A:
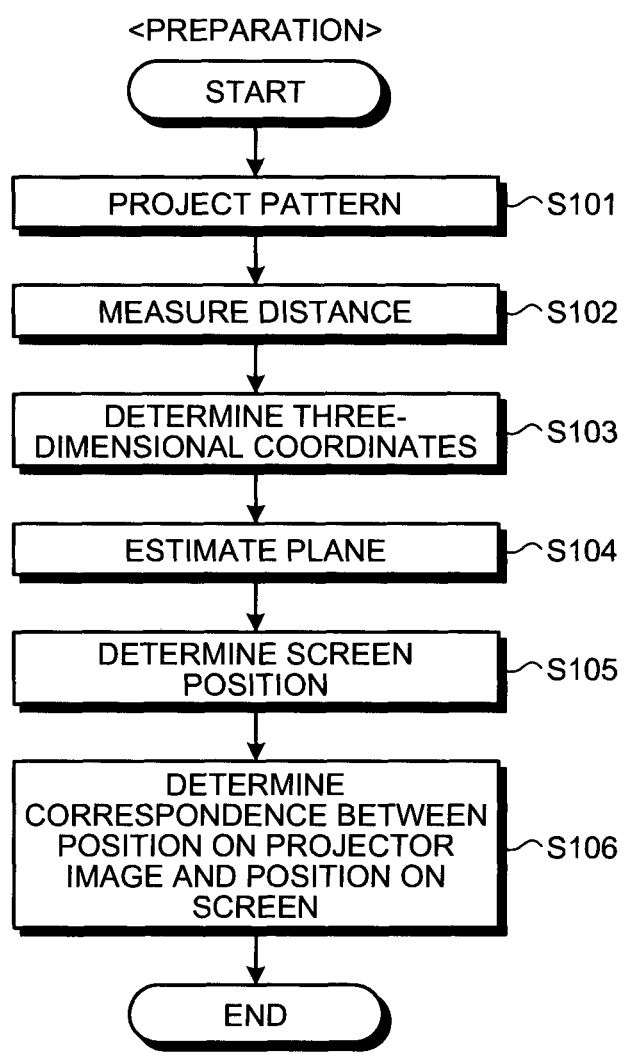
FIG. 20A is a flowchart of Operation Example 1 (preparation processing) according to the third embodiment.
Figure 20B:
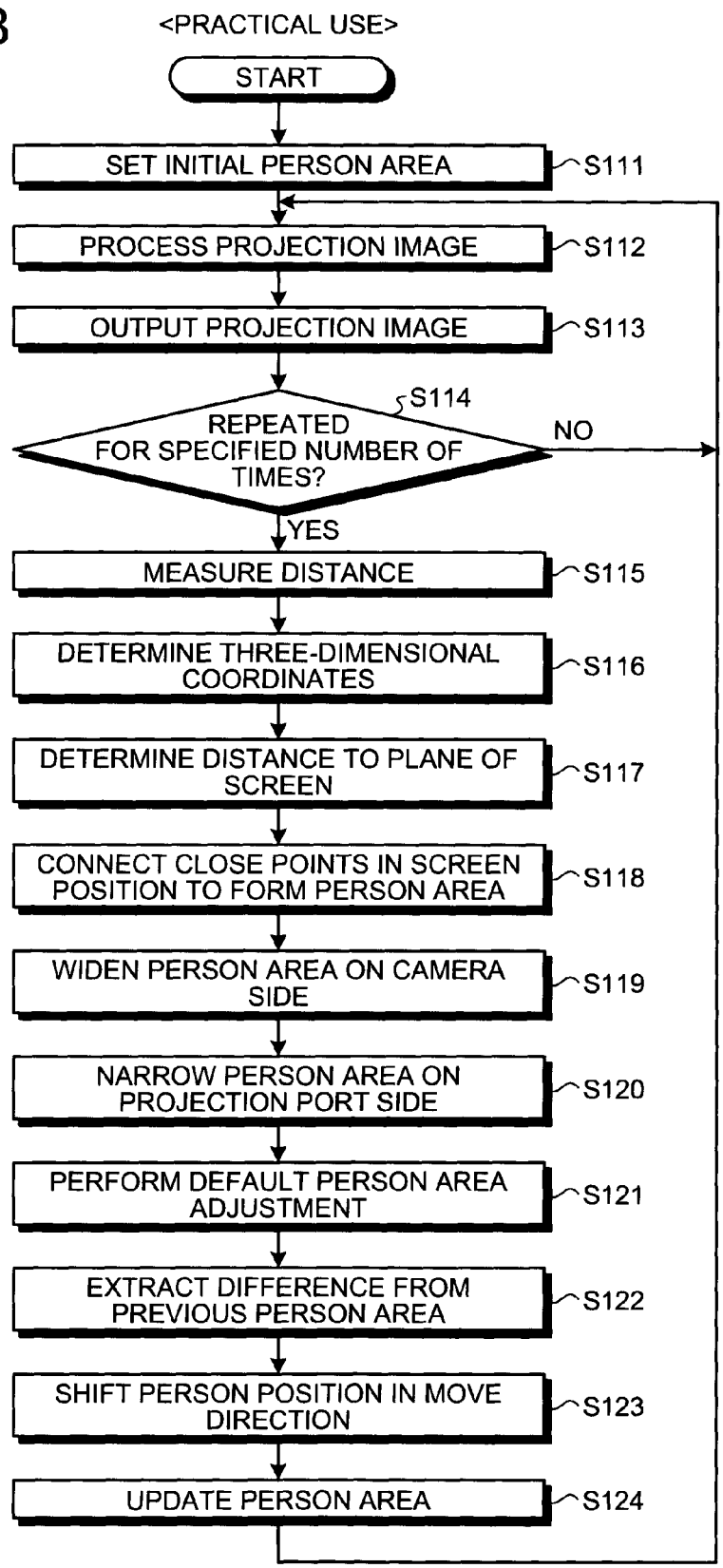
FIG. 20B is a flowchart of Operation Example 1 (processing in practical use) according to the third embodiment.

FIGS. 20A and 20B include flowcharts of Operation Example 1 according to the third embodiment. Operation Example 1 shows an example in which preparation processing (FIG. 20A) is performed before use.

<Preparation Processing>

Figure 21:
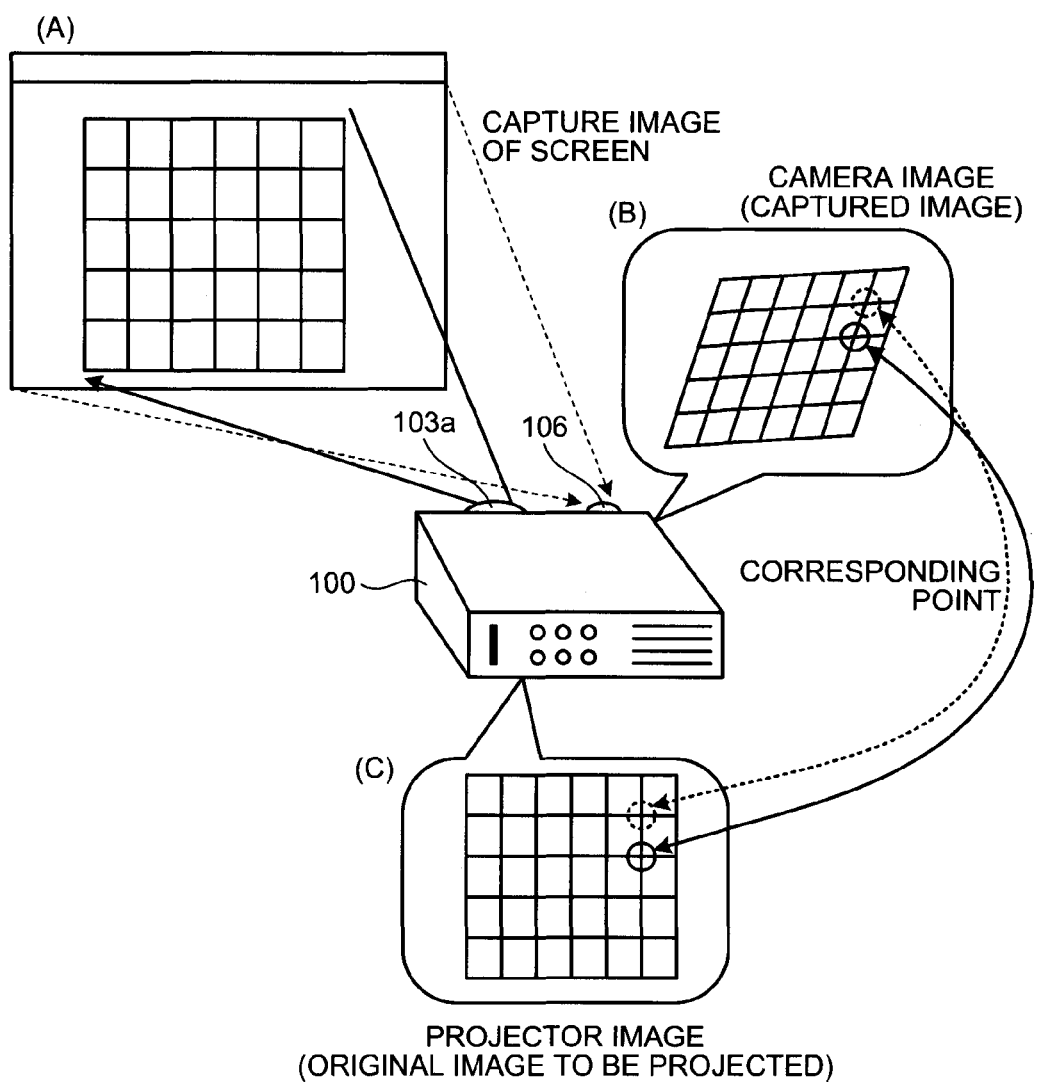
FIG. 21 is an explanatory view depicting pattern projection according to the third embodiment.

In FIG. 20A, first, projection is performed using previously provided digital data of an image of a mesh and the image is captured by the camera 106 (step S101). The exemplary image capturing is shown in FIG. 21. In FIG. 21, (A) indicates that an image of the screen 130 is captured, (B) indicates the image captured by the camera 106, and (C) indicates a projector image (original image to be projected).

Furthermore, after step S101 is performed, the distance information calculating unit 111 determines each intersection point, determines correspondence between images captured by the camera and the projector image, performs the distance measurement (step S102), and determines three-dimensional coordinates of the intersection points according to a direction and distance from the camera 106 (step S103). The plane estimating unit 113 then determines, on the bases of the three-dimensional coordinates of the intersection points, an equation of a plane passing through the intersection points (step S104). In this step, the equation of the plane, for example, $ax+by+cz+d=0$ is recorded in the plane equation storage unit 125. A position of the screen is then determined (step S105) and correspondence between a position of the projector image and the position of the screen 130 is determined (step S106).

<Processing in Practical Use>

After the preparation processing in FIG. 20A is performed, the processing in practical use in FIG. 20B is performed. In FIG. 20B, first, an initial person area image is set (step S111). In this case, a binary image is used where number of pixels (vertical and horizontal) is the same as that of an image to be projected, a pixel to be projected is set to 1, and a pixel where a beam is to be cut is set to 0. The initial value of all pixels is set to 1.

The image processing unit 112 processes the projection target image according to the beam cut image (step S112) and performs projection (image output) (step S113). It is then determined whether these processes are repeated for a specified number of times or for a predetermined number of images (step S114). When the predetermined number of images are processed (YES at step S114), processes after step S114 are performed. The number of images corresponds to sampling intervals for person detection (beam cut) and, if the number of images is reduced, person detection is performed more frequently.

The person detection is performed in the processes after step S114 as follows. First, distance to the screen 130 and a surface of the person is determined using the distance measurement unit, such as the camera 106 (step S115) and three-dimensional coordinates are calculated (step S116). The three-dimensional coordinates are then compared with a previously determined equation of the plane of the screen to determine distance between each point and the plane (step S117).

According to an equation of distance, distance from spatial points (x0, y0, z0) to the plane ax+by+cz+d=0 is as follows:

$$|ax0+by0+cz0+d|/\sqrt{(a^2+b^2+c^2)}$$

A set of points that are distant from the plane (close to the projector 100 if within the screen 130) is obtained.

The beam cut image generating unit 119 then determines a shape of an area including the set of the distant points and determines positions on the projector image on the basis of previously determined corresponding points, thereby determining an original beam cut area. This is used as the person area (see FIG. 23) (step S118). Furthermore, according to the positional relationship between the projection port 103a of the projector 100 and the distance measurement port, the area on the distance measurement port side is widened (step S119) and the area on the opposite side is narrowed (step S120). An example of this processing is shown in FIG. 16, FIG. 17, and FIG. 23.

Figure 22:
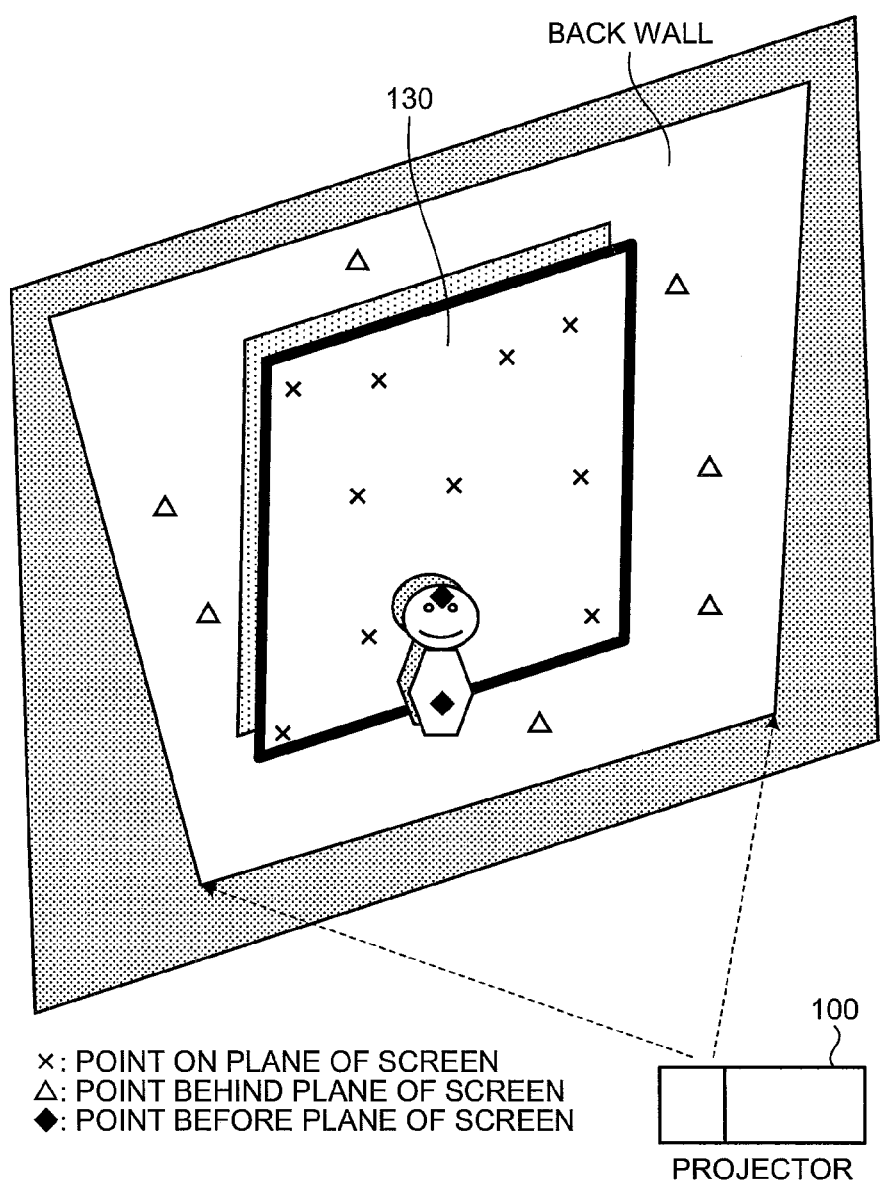
FIG. 22 is an explanatory view depicting a plane of a screen according to the third embodiment.
Figure 23:
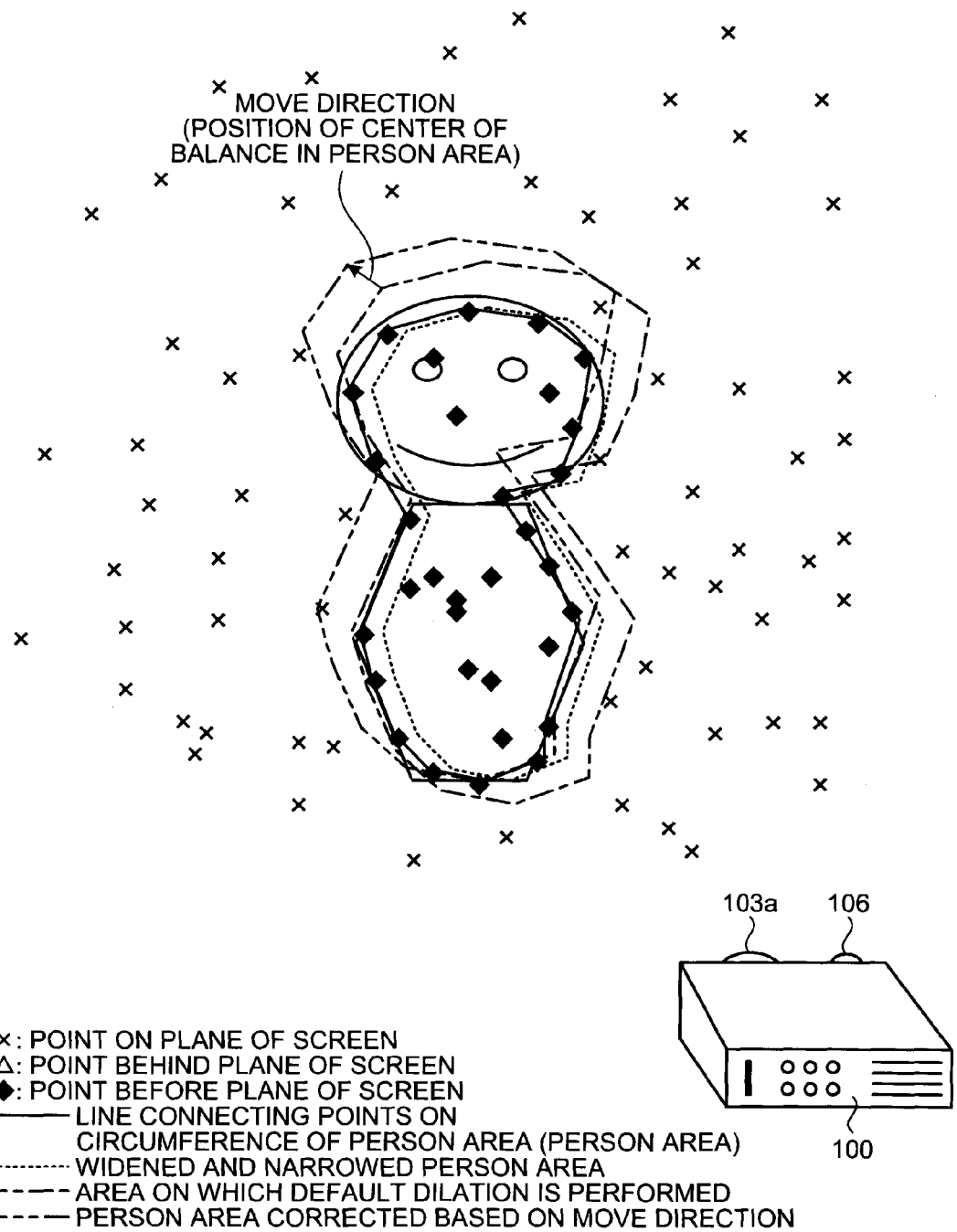
FIG. 23 is an explanatory view depicting an exemplary person area according to the third embodiment.

FIG. 22 shows an example of an image on a plane of a screen and FIG. 23 shows an example of the person area. A mark X indicates points on the plane of the screen, a mark Δ indicates points behind the plane of the screen, and a mark having a diamond shape indicates points before the plane of the screen. In FIG. 23, a mark X indicates points on the plane of the screen, a mark Δ indicates points behind the plane of the screen, a mark having a diamond shape indicates points before the plane of the screen, a solid line indicates a line connecting points on circumference of the person area (person area), a dashed line indicates narrowed person area and widened person area, a dashed-dotted line indicates a person area after default dilation is performed, and a dashed two-dotted line indicates a person area after correction in the movement direction is performed.

Default area adjustment is then performed (step S121). If dilation, erosion, etc. in the above-described embodiment is set to be performed, it is performed here (see FIG. 23). The person area is stored here (this process is referred to as [1]). The previous person position at [1] and the current person position at [1] are compared to each other to extract their difference (step S122), movement of a center of balance is determined, and the area is shifted in a direction of the movement of the center of balance (step S123). If the movement is faster, taking a wider person area makes it easier to prevent projection light from erroneously being applied to the person. Then, the person area (beam cut) is updated (step S124). Specifically, the beam cut image is updated (see FIG. 19). Thereafter, the process returns to the process at step S112 and the process following step S112 is performed repeatedly.

Operation Example 2

Figure 24:
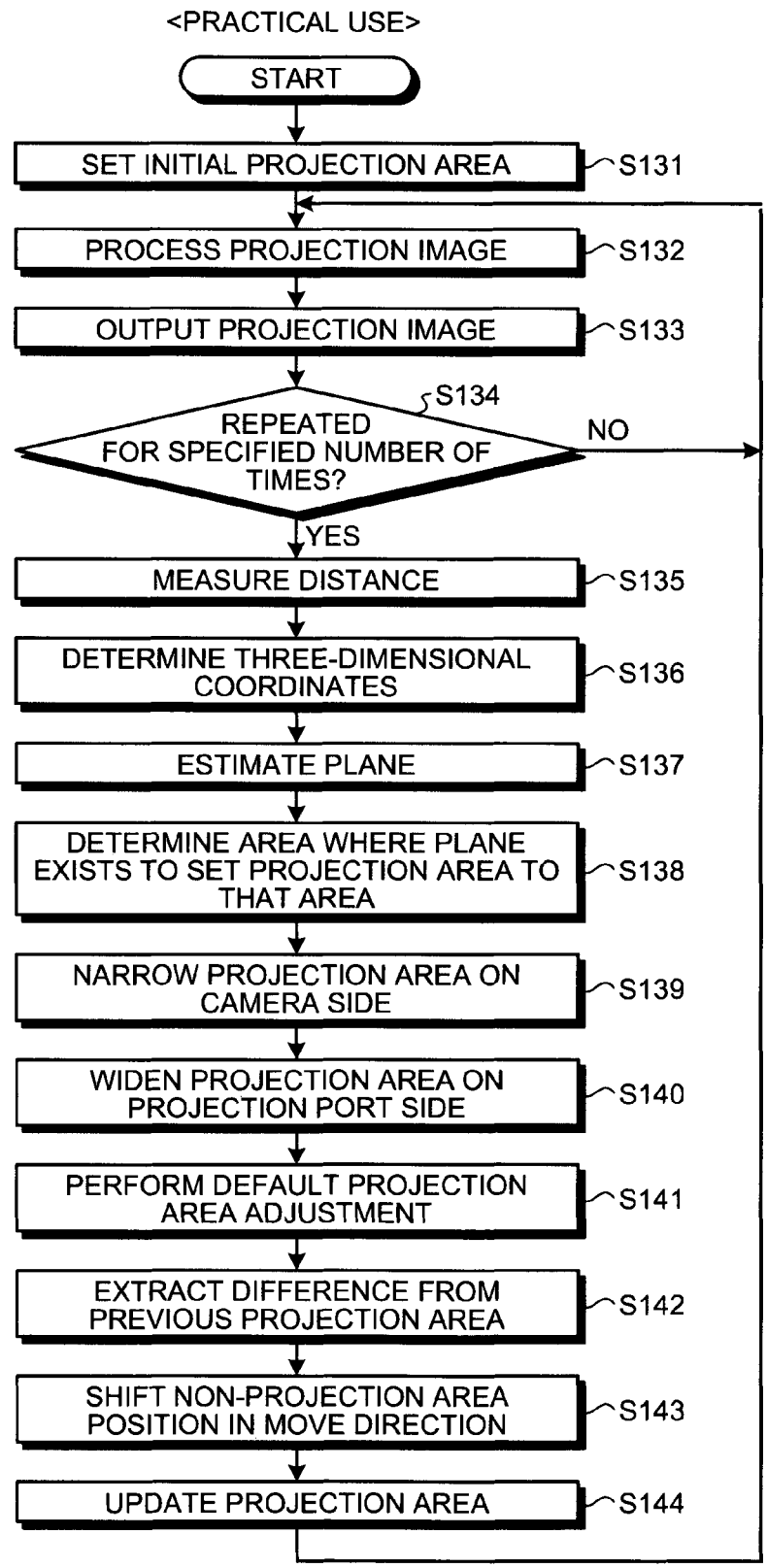
FIG. 24 is a flowchart depicting Operation Example 2 according to the third embodiment.

FIG. 24 is a flowchart of Operation Example 2 according to the third embodiment. Here, an example is illustrated in which the above-described preparation processing is unnecessary. Processes including processes redundant with those in FIG. 20B will be described here.

[Processing in Practical Use]

In FIG. 24, similarly to FIG. 20B, an initial projection area is set first (step S131). In this case, a binary image is used where the number of pixels (vertical and horizontal) is the same as that of the image to be projected, a projection target is 1, and a beam cut target is 0. The initial value of all pixels is 1.

The image processing unit 112 processes the projection target image according to the beam cut image (step S132) and performs projection (image output) (step S133). It is then determined whether these processes are repeated for a specified number of times or for a predetermined number of images (step S134). When the predetermined number of images are processed (YES at step S134), the process at step S135 is performed. The number of images corresponds to sampling intervals for person detection (beam cut) and, if the number of images is reduced, person detection is performed more frequently.

Person detection is performed from the process at step S135 as follows. First, distance to the screen 130 or a surface of a person is determined using the distance measurement unit, such as the camera 106 (step S135) and three-dimensional coordinates are calculated (step S136). The plane estimating unit 113 then performs plane estimation from the captured image (step S137) and excludes the points outside the plane. Circumference of the points constituting the plane is connected to define a projection area (see FIG. 23) (step S138).

According to the positional relationship between the projection port 103a of the projector 100 and the distance measurement port, the area on the distance measurement port side is widened (step S139) and the area on the opposite side is narrowed (step S140). An example of this processing is shown in FIG. 16, FIG. 17, and FIG. 23.

Default area adjustment is performed (step S141). If dilation, erosion, etc. in the above-described embodiment is set to be performed, it is performed here (see FIG. 23). The person area is stored here (this process is referred to as [1]). The previous person position at [1] and the current person position at [1] are compared to each other to extract difference between them (step S142). A non-projection position corresponds to an area before the screen 130 among positions that are not projection targets. Movement of a center of balance of the non-projection position is determined and shift in a direction of the movement of the center of balance is performed (step S143). Further, the projection area (beam projection position) is updated (step S144). Specifically, the beam cut image is updated (see FIG. 19). Thereafter, the process returns to the process at step S132 and the processes following step S132 are performed repeatedly.

A control program for each of units that each implements function of the obstacle detecting unit 3 or the projection adjusting unit 4 of the projection display system according to the embodiment can be provided by incorporating the control program in the NV-RAM, ROM, or other non-volatile storage medium of the obstacle detecting unit 3 and the projection adjusting unit 4. Alternatively, the control program can be provided by recording the control program in a file of an installable format or an executable format in a computer-readable storage medium, such as a CD-ROM, a FD (flexible disk), a CD-R, or a DVD (digital versatile disk).

Alternatively, the control program may be provided or distributed by storing the computer program in a computer connected to a network, such as the Internet, and allowing a download of the control program via the network.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:
1. A projection display device comprising:
an image light projecting unit that projects image light on a screen;
a distance measurement unit that measures distance to the screen;

an obstacle detecting unit that detects an obstacle between the screen and the image light projecting unit on the basis of distance information obtained by the distance measurement unit and, according to a result of this detection, determines an adjustment area where the image light to be projected is to be adjusted;

a projection adjusting unit that adjusts the image light in the adjustment area;

a distance information calculating unit that calculates distance information regarding multiple points from multiple images;

a plane estimating unit that approximately estimates a plane corresponding to a projection surface from the distance information calculated by the distance information calculating unit;

a person position estimating unit that estimates a position of a person on the basis of the plane estimated by the plane estimating unit and the distance information calculated by the distance information calculating unit; and a projection light adjusting unit that adjusts projection light at the position of the person estimated by the person position estimating unit.

2. The projection display device according to claim 1, wherein the projection adjusting unit sets luminance of the image light in the adjustment area to a black level.

3. The projection display device according to claim 1, wherein the projection light adjusting unit includes a position adjusting unit that adjusts the position according to the positional relationship between the distance measurement unit and the image light projecting unit.

4. The projection display device according to claim 3, wherein the projection light adjusting unit further includes:
a person movement detecting unit that detects movement of a person,
wherein the projection light adjusting unit adjusts projection light according to the movement of the person detected by the person movement detecting unit.

5. The projection display device according to claim 4, further comprising a person area adjusting unit that adjusts the person area such that the person area is wider in a case where the movement of the person is faster and the person area is narrower in a case where the movement of the person is slower.

6. The projection display device according to claim 2, wherein the obstacle detecting unit calculates, for each pixel, a distance difference that is a difference between distance detected by the distance measurement unit and distance to the screen from the distance measurement unit, and determines that there is the obstacle at a pixel where the distance difference is equal to or greater than a threshold.

7. A projection display system comprising:
a projection display device including:
an image light projecting unit that projects image light on a screen; and
a distance measurement unit that measures distance to the screen; and
an information processing device including:
an obstacle detecting unit that detects an obstacle between the screen and the image light projecting unit on the basis of distance information obtained by the distance measurement unit and, according to a result of this detection, determines an adjustment area where the image light to be projected is to be adjusted;
a projection adjusting unit that adjusts the image light in the adjustment area;
a distance information calculating unit that calculates distance information regarding multiple points from multiple images;
a plane estimating unit that approximately estimates a plane corresponding to a projection surface from the distance information calculated by the distance information calculating unit;
a person position estimating unit that estimates a position of a person on the basis of the plane estimated by the plane estimating unit and the distance information calculated by the distance information calculating unit; and
a projection light adjusting unit that adjusts projection light at the position of the person estimated by the person position estimating unit.

8. A computer program product comprising a non-transitory computer-usable medium having computer-readable program codes embodied in the medium, wherein the program codes when executed causes a computer to perform:
an obstacle detection step of detecting an obstacle on the basis of information on distance from a projection display device to a screen and, according to a result of this detection, determining an adjustment area where image light to be projected by the projection display device is to be adjusted;
a projection adjustment step of adjusting the image light in the adjustment area and projecting the adjusted image light to the projection display device;
a distance information calculating step of calculating distance information regarding multiple points from multiple images;
a plane estimating step of approximately estimating a plane corresponding to a projection surface from the distance information calculated at the distance information calculating step;
a person position estimating step of estimating a position of a person on the basis of the plane estimated at the plane estimating step and the distance information calculated at the distance information calculating step; and
a projection light adjusting step of adjusting projection light at the position of the person estimated at the person position estimating step.

* * * * *